United States Patent
Bolshtyansky et al.

(10) Patent No.: US 9,825,726 B2
(45) Date of Patent: Nov. 21, 2017

(54) EFFICIENT OPTICAL SIGNAL AMPLIFICATION SYSTEMS AND METHODS

(71) Applicant: Tyco Electronics Subsea Communications LLC, Eatontown, NJ (US)

(72) Inventors: Maxim Bolshtyansky, East Windsor, NJ (US); Dmitri Foursa, Colts Neck, NJ (US); Sheng Zhang, Bedminster, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 84 days.

(21) Appl. No.: 15/006,084

(22) Filed: Jan. 25, 2016

(65) Prior Publication Data

US 2017/0214483 A1 Jul. 27, 2017

(51) Int. Cl.
  H04J 14/02 (2006.01)
  H04B 10/61 (2013.01)
  H04B 10/80 (2013.01)

(52) U.S. Cl.
  CPC ........ H04J 14/0221 (2013.01); H04B 10/616 (2013.01); H04B 10/80 (2013.01)

(58) Field of Classification Search
  CPC .... H04J 14/02; H04J 14/0221; H04B 10/616; H04B 10/80

(Continued)

(56) References Cited

U.S. PATENT DOCUMENTS 5,392,154 A   2/1995   Chang et al.
5,563,733 A   10/1996  Mitsuda et al.
(Continued)

FOREIGN PATENT DOCUMENTS

EP   1073166    1/2001
JP   4-101124   4/1992
(Continued)

OTHER PUBLICATIONS

Sun et al; "An 80 nm Ultra Wide Band EDFA with Low Noise Figure and High Output Power"; ECOC 1997, Sep. 22-25, 1997; Conference Publication No. 448, pp. 69-72.
(Continued)

*Primary Examiner* — Tesfaldet Bocure

(57) ABSTRACT

An optical communication amplification system may include a number of amplification stages for an optical signal that includes a first optical wavelength band signal portion and a second optical wavelength band signal portion. Each amplification stage may separate the first optical wavelength band signal portion from the second optical wavelength band signal portion. The separated first optical wavelength band signal portion is amplified using one or more first optical wavelength band amplifiers and the separated second optical wavelength band signal portion are amplified using one or more second optical wavelength band amplifiers. The amplified first optical wavelength band signal portion is filtered and a reflected portion of the first optical wavelength band signal portion may be used to provide energy to the one or more second optical wavelength band amplifiers to increase the power or gain of the separated second optical wavelength band signal portion.

26 Claims, 18 Drawing Sheets

(58) Field of Classification Search
USPC .......................................................... 398/79
See application file for complete search history.

(56) References Cited

U.S. PATENT DOCUMENTS

| | | | |
|---|---|---|---|
| 5,675,432 | A | 10/1997 | Kosaka |
| 5,790,721 | A | 8/1998 | Lee |
| 5,905,838 | A | 5/1999 | Judy et al. |
| 5,978,130 | A | 11/1999 | Fee et al. |
| 6,049,416 | A | 4/2000 | Srivastava et al. |
| 6,049,417 | A | 4/2000 | Srivastava et al. |
| 6,049,418 | A | 4/2000 | Srivastava et al. |
| 6,081,366 | A | 6/2000 | Kidorf et al. |
| 6,091,538 | A | 7/2000 | Takeda et al. |
| 6,101,024 | A | 8/2000 | Islam et al. |
| 6,104,527 | A | 8/2000 | Yang |
| 6,236,496 | B1 | 5/2001 | Yamada et al. |
| 6,304,370 | B1 | 10/2001 | Barnard |
| 6,307,668 | B1 | 10/2001 | Bastien et al. |
| 6,317,254 | B1 | 11/2001 | Park et al. |
| 6,356,384 | B1 | 3/2002 | Islam |
| 6,469,826 | B1 | 10/2002 | Masuda et al. |
| 6,532,104 | B1 | 3/2003 | Bayart |
| 6,882,466 | B1 | 4/2005 | Shimojoh et al. |
| 6,972,898 | B2 | 12/2005 | Hwang et al. |
| 7,081,989 | B2 | 7/2006 | Song et al. |
| 7,738,165 | B2 | 6/2010 | Ahn et al. |
| 7,876,497 | B2 | 1/2011 | Desbiens |
| 2002/0131131 | A1 | 9/2002 | Nagel et al. |
| 2003/0016346 | A1 | 1/2003 | Umeda et al. |
| 2003/0206334 | A1* | 11/2003 | Hwang .............. H01S 3/06754 359/341.5 |
| 2003/0218754 | A1 | 11/2003 | Umeda |
| 2004/0075891 | A1* | 4/2004 | Hwang ................. H01S 3/067 359/341.5 |
| 2004/0233518 | A1 | 11/2004 | Song et al. |
| 2007/0081226 | A1 | 4/2007 | Sommer et al. |

FOREIGN PATENT DOCUMENTS

| | | |
|---|---|---|
| JP | 4101124 | 4/1992 |
| JP | 2710199 | 10/1997 |

OTHER PUBLICATIONS

Sun et al; "Ultra Wide Band Erbium-Doped Silica Fiber Amplifier with 80 nm of Bandwidth"; Reprinted from Optical Amplifiers and Their Applications; 1997 Technical Digest; 1997; Optical Society of America; pp. 144-147.

Bayart et al; "Advanced Architectures for Wideband WDM Amplifiers"; OFC 1997 Technical Digest; pp. 162-163.

Srivastava et al; "1Tb/s Transmission of 100 WDM 10 Gb/s Channels Over 400 km of TrueWave(TM) Fiber"; 1998 OSA/OFC 1998; pp. 464-467.

Ma et al; "765 Gb/s Over 2,000 km Transmission Using C- and L-Band Erbium Doped Fiber Amplifiers"; 1999 OSA/OFC 1999; pp. PD16-1 thru PD16-3.

Sun et al; "A Gain-Flattened Ultra Wide Band EDFA for High Capacity WDM Optical Communications Systems"; ECOC 1998; Sep. 20-24, 1998, Madrid, Spain; pp. 53-54.

Yamashita et al; Er3+ Doped Fibre Amplifier Operating at Wavelengths of 1.55 and 1.60um; Electronics Letters; Jun. 6, 1996; vol. 32; No. 12; pp. 1102-1103.

Massicott et al; "Low Noise Operation of Er3+ Doped Silica Fibre Amplifer Around 1 6um"; Electronics Letters; Sep. 24, 1992; vol. 28, No. 20; pp. 1924-1925.

Oda et al; "16-Channel×10-Gbit/s Optical FDM Transmission Over a 1000 km Conventional Single-Mode Fiber Employing Dispersion-Compensating Fiber and Gain Equalization"; Optical Fiber Communication '95, Postdeadline Papers; Feb. 26-Mar. 3, 1995, San Diego Convention Center; San Diego, CA, PD22-1 thru PD22-5.

Office Action dated Jul. 13, 2017 in connection with correspondence U.S. Appl. No. 15/291,515.

* cited by examiner

EFFICIENT OPTICAL SIGNAL AMPLIFICATION SYSTEMS AND METHODS

TECHNICAL FIELD

The present disclosure relates to optical transmission of information and, more particularly, to systems and methods for self-powering optical transmission systems.

BACKGROUND

Long-haul optical communication systems, e.g., optical communication systems spanning a distance of greater than about 600 kilometers, suffer from signal attenuation resulting from a variety of factors, including scattering, absorption, and bending. To compensate for attenuation, long-haul systems may include a series of optical amplifiers or "repeaters" spaced along the transmission path between a transmitter and a receiver. The amplifiers amplify the optical signal in a manner allowing reliable detection at the receiver. Usually, multiple repeaters are positioned along a single fiber optic transmission link, with numbers reaching more than a hundred per link in submarine systems. Power efficiency of repeaters, particularly those used in submarine applications, is quite important. For terrestrial systems, increasing efficiency is crucial for reducing amplifier size and cost, including material and operating costs. For submarine systems increasing efficiency is important to minimize the cost of labor of installing multiple repeaters in remote, difficult to reach, locations and in supplying energy to the repeaters in such locations.

Erbium doped fiber amplifiers (EDFAs) have proven particularly useful in long-haul systems. EDFAs include C-band EDFAs and L-band EDFAs which are used to amplify different optical bands, denoted as C-band and L-band. C-band usually includes wavelengths from 1530 nanometers (nm) to 1565 nm and L-band usually includes wavelengths from 1565 nm to 1625 nm. Both C-band and L-band features the lowest attenuation of commonly used optical transmission bands, the exact wavelength of the lowest attenuation depends on fiber design and can be in either C or L band. EDFAs may amplify only C-band signals (referred to as a "C-band EDFA"), only L-band signals (referred to as an "L-band EDFA") or both C-band and L-band signals (referred to as a "C+L EDFA"). Generally, each EDFA includes nearly independent C-band and L-band amplification portions—i.e., the amplifier is a combination of two EDFAs: one C-band EDFA and one L-band EDFA, with economies taken in the form of shared components within the C+L EDFA. In a C+L EDFA, the input optical signal is usually split between C-band and L-band using a device such as a C+L demultiplexer or splitter. The C-band and L-band signals are independently amplified and recombined using a C+L multiplexer or combiner. Physically, the splitter and the combiner may be similar devices and the name simply denotes the functionality assigned to the device.

Usually, an EDFA is used to produce gain having a particular spectral shape over the signal wavelength band—i.e., over the amplification band or range of the device. The spectral shape is usually "flat" inasmuch as the amplification across the wavelength band of the device is either similar or varies linearly with the signal wavelength. The exact amplification shape may be achieved through the use of a Gain Flattening Filter (GFF).

Several types of GFF exist. One type of GFF uses Short Period Fiber Bragg Grating (SP-FBG) that is able to provide very accurate shaping of the optical signal over the amplification band. Such accuracy is advantageous in long links that characterize submarine communication systems where the number of repeaters is large and errors in the EDFA gain shapes are undesirable. One feature of SP-FBG filters is that the filtering function is performed by redirecting unneeded light, including both signal and amplified spontaneous emission (ASE) noise in the backward direction—i.e., in a direction opposite the direction of propagation of the optical signal. Usually, the back propagated light is undesirable for the upstream EDFAs and is blocked using an isolator positioned before the SP-FBG filter.

There is therefore a need for systems and methods of reducing the power demand presented by amplifiers along difficult to access optical transmission lines such as submarine transmission lines. There is also a need for systems and methods of beneficially recovering the energy present in the optical signals reflected by filters such as SP-FBG filters, particularly along difficult to access optical transmission lines such as submarine transmission lines.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1A:
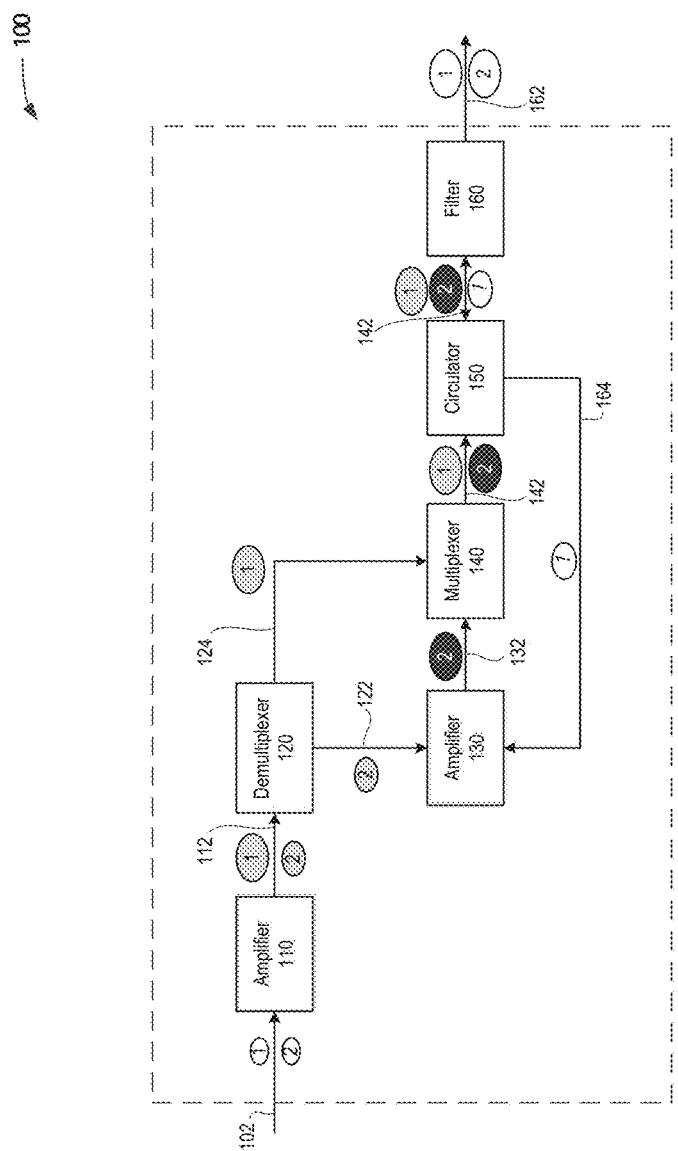
FIG. 1A is a block diagram of an illustrative amplification and reflected signal energy recovery system, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

An optical signal may include multiple bands, for example a first portion that may include a plurality of signals within C-band wavelengths (1530 nanometers (nm) to 1565 nm) and a second portion that may include a plurality of signals within L-band wavelengths (1565 nm to 1625 nm). Each of the different wavelength signals may be introduced onto a single core fiber using any current or future developed multiplexing technology, for example wavelength division multiplexing (WDM). As an optical signal travels along the fiber, significant attenuation may occur over long distances, and may present a significant challenge to the integrity of the data carried by the optical signal, such as those encountered in submarine communication systems. Amplifiers may be positioned along such fibers to boost the optical signal and minimize or prevent data loss at the terminal end of the fiber.

As an optical signal is amplified, the amplifier gain needs to be carefully designed controlled. In EDFAs, the gain is provided by pumped Erbium Doped Fiber (EDF), however, the gain shape of the pumped EDF is not flat and is not the one which is required for the amplifier to compensate the losses in transmission fiber. To address this issue, most amplifiers include one or more gain flattening filters (GFFs) to compensate for the gain differences introduced by EDF in different channels and to achieve the overall required gain shape. GFFs can also be used to suppress gain outside of the bands of the interest to reduce undesirable amplification of light that does not carry any information.

Certain filter types, such as a Short Period Fiber Bragg Grating (SP-FBG) filter may reflect a portion of the optical signal in the form of unneeded signal and amplified spontaneous emission (ASE) back along the fiber. Where the optical signal includes signals in the first wavelength band (e.g., C-band) and in the second wavelength band (e.g., L-band), a portion of the energy in the signals reflected by the SP-FBG filter may be used to pump the L-band portion of a C-band/L-band erbium doped fiber amplifier (C+L EDFA). In installations containing a C-band gain flattening filter (GFF) and an L-band GFF, only the energy contained in the signal reflected from the C-band GFF may be reused for L-band pumping. In implementations using a combined GFF (i.e., a single GFF for filtering both C-band and L-band), the L-band light may be blocked or otherwise removed and/or dissipated prior to introducing the reflected light to the L-band portion of the EDFA for pumping. Such an arrangement may advantageously increase the efficiency of the EDFA without increasing the overall power budget.

An optical communication amplification system is provided. The optical communication amplification system may include an optical splitter to separate an optical signal into at least a first optical wavelength band signal portion and the second optical wavelength band signal portion. The system may further include an optical amplifier operably coupled to the optical splitter, the optical amplifier to increase the energy of the second optical wavelength band signal portion. The system may additionally include an optical combiner that combines the first optical wavelength band signal portion and the amplified second optical wavelength band signal portion and an optical filter operably coupled to the optical combiner, wherein a portion of the energy of the first optical wavelength band signal portion reflected from the optical filter is received by the optical amplifier where the received energy increases the energy of the second optical wavelength band signal portion.

An optical communication amplification method is also provided. The method may include splitting an optical signal into a first optical wavelength band signal portion and a second optical wavelength band signal portion and amplifying, via an optical amplifier, the second optical wavelength band signal portion of the optical signal. The method may further include combining the first optical wavelength band signal portion and the amplified second optical wavelength band signal portion to provide an amplified optical signal and filtering, via at least one optical filter, the amplified optical signal. The method may additionally include receiving, by the optical amplifier, at least a portion of the first optical wavelength band signal portion reflected by the at least one optical filter and increasing the energy of the optical amplifier using energy in the reflected portion of the first optical wavelength band signal portion.

An optical communication amplification method is also provided. The method may include amplifying, by an optical amplifier, an optical signal that includes at least a first optical wavelength band signal portion and a second optical wavelength band signal portion. The method may further include passing the amplified optical signal through at least one optical filter, receiving, at the optical amplifier, at least a portion of energy in the first optical wavelength band signal portion reflected by the at least one optical filter, and increasing the energy of an optical amplifier used to increase the energy level of the second optical wavelength signal portion using the reflected energy in the first optical wavelength signal portion.

As used herein, the terms "top" and "bottom" are intended to provide a relative and not an absolute reference to a location. Thus, inverting an object having a "top cover" and a "bottom cover" may place the "bottom cover" on the top of the object and the "top cover" on the bottom of the object. Such configurations should be considered as included within the scope of this disclosure.

As used herein, the terms "first," "second," and other similar ordinals are intended to distinguish a number of similar or identical objects and not to denote a particular or absolute order of the objects. Thus, a "first object" and a "second object" may appear in any order—including an order in which the second object appears before or prior in space or time to the first object. Such configurations should be considered as included within the scope of this disclosure.

Figure 1B:
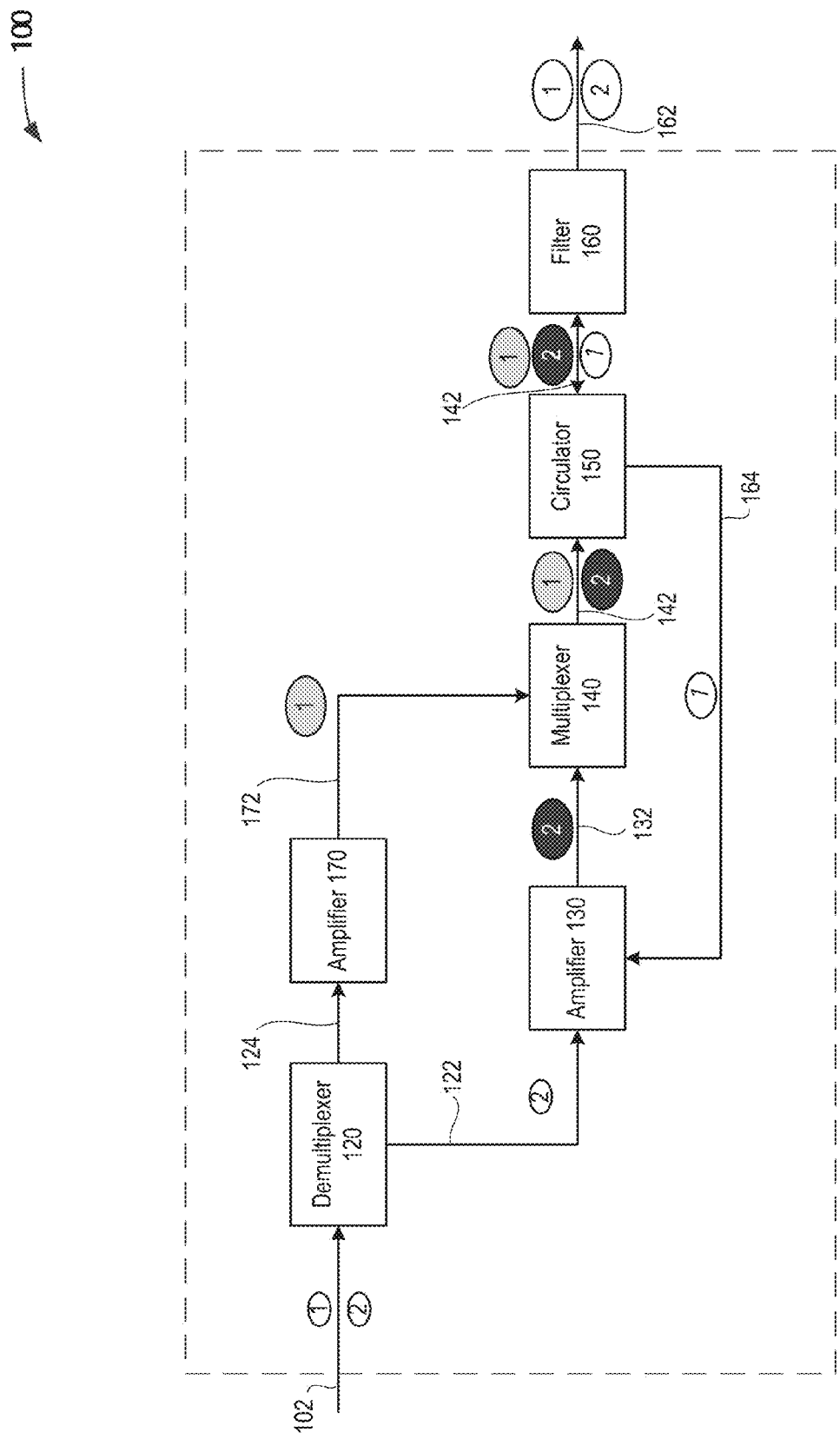
FIG. 1B is a block diagram of an alternative illustrative amplification and reflected signal energy recovery system, in accordance with at least one embodiment of the present disclosure.
Figure 1C:
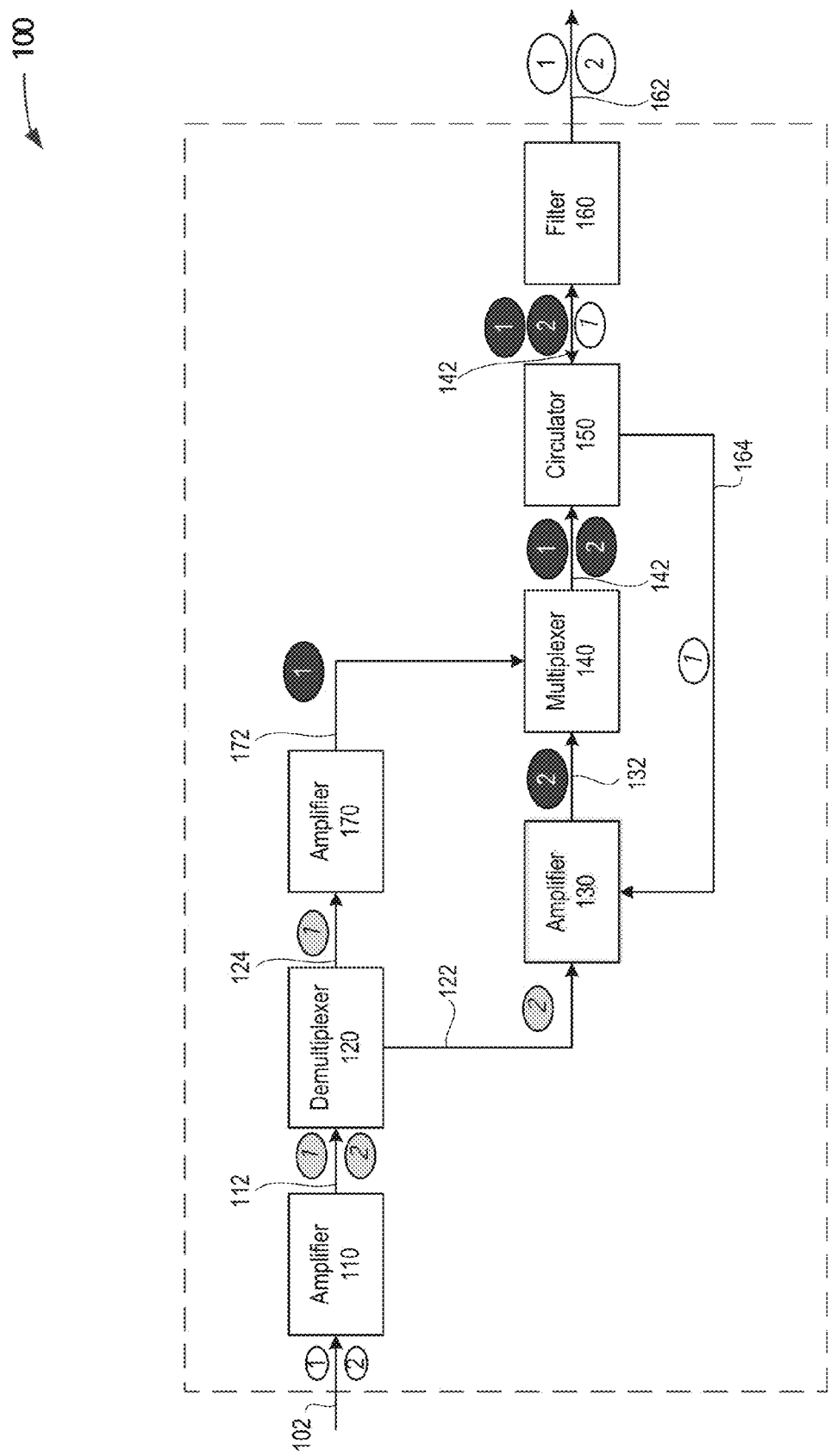
FIG. 1C is a block diagram of another alternative illustrative amplification and reflected signal energy recovery system, in accordance with at least one embodiment of the present disclosure.

FIG. 1A is a block diagram of an illustrative amplification and reflected signal energy recovery system 100, in accordance with at least one embodiment of the present disclosure. FIG. 1B is a block diagram of an alternative illustrative amplification and reflected signal energy recovery system 100, in accordance with at least one embodiment of the present disclosure. FIG. 1C is a block diagram of another alternative illustrative amplification and reflected signal energy recovery system 100, in accordance with at least one embodiment of the present disclosure.

Referring first to FIG. 1A, in embodiments, an incoming signal 102 may include any number of individual signals within a first portion of the optical spectrum in combination with (e.g., multiplexed with) any number of individual signals within a second portion of the optical spectrum. In implementations, the first portion of the optical spectrum may correspond to any plurality of frequencies within the optical spectrum, such as the C-band portion of the optical spectrum that includes signals having wavelengths between 1530 nanometers (nm) and 1565 nm. In some implementations, the second portion of the optical spectrum may correspond to any plurality of frequencies within the optical spectrum, such as the L-band portion of the optical spectrum that includes signals having wavelengths between 1565 nm and 1625 nm.

As depicted in FIG. 1, an oval surrounding a numeral "1" is used to denote the first portion (e.g., the C-band portion) of the optical spectrum, the size of the oval indicates the relative strength of the first portion of the optical spectrum (larger indicating greater signal strength or energy), and shading within the oval indicates the relative noise present within the first portion of the optical spectrum (darker corresponding to greater noise levels). Similarly, an oval surrounding a numeral "2" is used to denote the second portion (e.g., the L-band portion) of the optical spectrum, the size of the oval indicates the relative strength of the second portion of the optical spectrum (larger indicating greater signal strength or energy), and shading within the oval indicates the relative noise present within the second portion of the optical spectrum (darker corresponding to greater noise levels).

Within the amplification and reflected signal energy recovery system 100, the signal 102 may be introduced to one or more amplifiers 110. The one or more amplifiers 110 may include any number and/or combination of current or future developed optical amplifiers, such as one or more erbium doped fiber amplifiers. In some implementations, the one or more amplifiers 110 may amplify both the first portion and the second portion of signal 102. In such implementations, the one or more amplifiers 110 may equally or unequally amplify the first portion and the second portion of the incoming signal 102. In some implementations, the one or more amplifiers 110 may amplify either the first portion or the second portion of the incoming signal 102. Regardless of the portion of the optical spectrum amplified, the one or more amplifiers 110 introduce a quantity of noise into a signal 112 that is output by the one or more amplifiers 110. As depicted in FIG. 1, the signal 112 provided by the one or more amplifiers 110 may include an amplified first portion of the incoming signal 102 and an amplified second portion of the incoming signal 102.

The signal 112 from the one or more amplifiers 110 may be introduced to one or more demultiplexers 120. The one or more demultiplexers may include any number and/or combination of current or future developed multiplexers and/or demultiplexers, for example a three-port or four-port wavelength division multiplexer (WDM) combiner. In embodiments, the one or more demultiplexers 120 may separate the first portion of the signal 112 from the second portion of the signal 112. The one or more demultiplexers 120 output a signal 122 that includes some or all of the second portion of signal 112 and a signal 124 that includes some or all of the first portion of signal 112.

The output 122 from the demultiplexer 120 containing the second portion of signal 112 may be introduced to one or more amplifiers 130. The one or more amplifiers 130 may include any number and/or combination of current or future developed optical amplifiers, such as one or more erbium doped fiber amplifiers. In some implementations, the one or more amplifiers 130 may amplify some or all of the second portion of the incoming signal 102. Regardless of the portion of the optical spectrum amplified, the one or more amplifiers 130 introduce a quantity of noise into the output 132 produced by the one or more amplifiers 130. As depicted in FIG. 1, the one or more amplifiers 130 generate an output 132 that includes a further amplified second portion of the incoming signal 102.

The output 132 from the one or more amplifiers 130 may be introduced to one or more multiplexers 140. Within the one or more multiplexers 140, the amplified second portion of the incoming signal 102 in the output 132 received from the one or more amplifiers 130 is combined with the amplified first portion of the incoming signal 102 in the output 124 received from the one or more demultiplexers 120. The one or more multiplexers 140 may include any number and/or combination of current or future developed multiplexers, for example a three-port or four-port wavelength division multiplexer (WDM). In embodiments, the one or more multiplexers 140 may generate an output 142 that includes some or all of the amplified first portion of the incoming signal 112 and some or all of the amplified second portion of the incoming signal 102. Having passed through the one or more amplifiers 110, the amplified first portion of the incoming signal 102 received by the one or more multiplexers 140 may include noise. Having passed through the one or more amplifiers 110 and the one or more amplifiers 130, the amplified second portion of the incoming signal 102 may contain noise at a level exceeding the noise level of the amplified first portion of the incoming signal 102.

One or more filters 160 receive the output 142 from the one or more multiplexers 140 via one or more optical circulators 150. The one or more optical circulators 150 may include any number and/or combination current or future developed devices and/or systems capable of separating optical signals traveling in opposite directions along an optical fiber. In some implementations, the one or more optical circulators 150 may include a three-port device in which an optical signal entering a first port exits via the next sequential port (i.e., an optical signal entering port 1 exits via port 2 and an optical signal entering via port 2 exits via port 3). In some implementations, the one or more circulators 150 may provide a high level of isolation between the input optical signal and a reflected optical signal. In some implementations, the one or more circulators 150 may provide relatively low insertion losses within the amplification and reflected signal energy recovery system 100.

The one or more filters 160 may include any number and/or combination current or future developed devices and/or systems capable of separating or otherwise removing at least one optical wavelength from a larger plurality of optical wavelengths. In some implementations, the one or more filters 160 may include a number of gain flattening filters (GFF). In some implementations, the one or more filters 160 may include a number of Short Period Fiber Bragg Grating (SP-FBG) filters capable of providing accurate shaping of the output 142 from the one or more optical circulators 150 over the amplification band of the one or more amplifiers 110, the one or more amplifiers 130, or combinations thereof. In at least some implementations, the one or more filters 160 may produce an output signal 162 that includes at least the filtered and amplified first portion of the incoming signal 102 and at least the filtered and amplified second portion of the incoming signal 102. In some implementations, the filtered and amplified first portion of the incoming signal 102 included in the output signal 162 may have an energy level greater than the energy level of the first portion of the incoming signal 102 received by the one or more amplifiers 110. In some implementations, the filtered and amplified second portion of the incoming signal 102 included in the output signal 162 may have an energy level greater than the energy level of the second portion of the incoming signal 102 received by the one or more amplifiers 110.

In operation, the one or more filters 160 reflect at least a portion of the energy included in the amplified first portion of the incoming signal 102. In FIG. 1, this reflected portion of the amplified first portion of the incoming signal 102 is depicted as an oval containing an italicized numeral "1." The one or more circulators 150 provide an output 164 that includes at least a portion of the energy contained in the amplified first portion of the incoming signal 102 reflected by the one or more filters 160. The output 164, containing the portion of the energy contained in the amplified first portion of the incoming signal 102 reflected by the one or more filters 160 may be directed to the one or more amplifiers 130 where at least some of the energy may be used to amplify or increase the energy level of the second portion of the incoming signal 102.

Referring now to FIG. 1B, the one or more amplifiers 110 upstream of the one or more demultiplexers 120 have been removed. The signal 102 now first enters the one or more demultiplexers 120. The output 124 of the one or more demultiplexers 120 includes the first portion of signal 102. One or more amplifiers 170 receive the first portion of signal 102 and output 172 an amplified first portion of signal 102. The one or more amplifiers 170 may include any number and/or combination of current or future developed optical amplifiers, such as one or more erbium doped fiber amplifiers. In some implementations, the one or more amplifiers 170 may amplify only the first portion of signal 102. The one or more amplifiers 170 introduce a quantity of noise into the signal 172 that is output by the one or more amplifiers 170. The remainder of the amplification and reflected signal energy recovery system 100 depicted in FIG. 1B remains similar to that depicted in FIG. 1A.

Referring now to FIG. 1C, the one or more demultiplexers 120 provide an output 124 that includes the first portion of signal 102. The output 124 is introduced to one or more amplifiers 170 prior to being introduced to one or more multiplexers 140. The remainder of the amplification and reflected signal energy recovery system 100 depicted in FIG. 1C remains similar to that depicted in FIGS. 1A and 1B.

FIGS. 1A-1C demonstrate the beneficial recovery and reuse of energy contained in the amplified first portion of the incoming signal 102 reflected by the one or more filters 160 back to the one or more circulators 150. Such energy recovery and reuse may advantageously reduce the quantity of energy consumed by the amplification and reflected signal energy recovery system 100.

Figure 2:
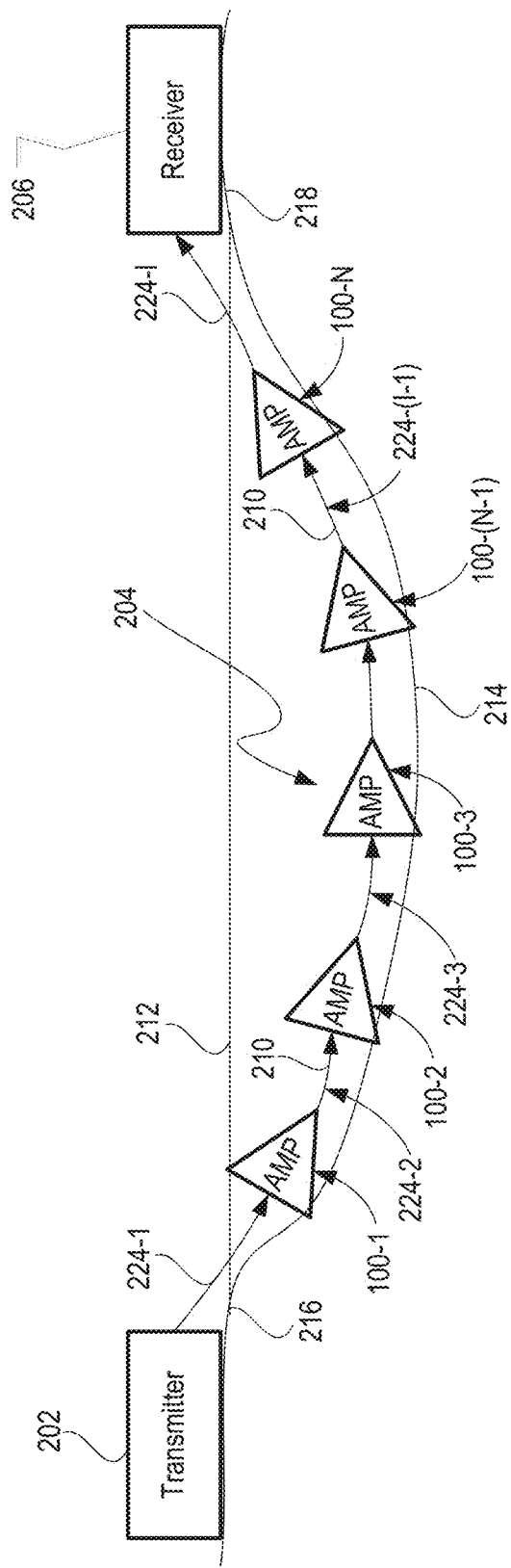
FIG. 2 is a schematic diagram depicting a number of amplification and reflected signal energy recovery system positioned along a submarine optical transmission cable, in accordance with at least one embodiment of the present disclosure.

Turning now to FIG. 2, there is illustrated an exemplary optical communication system 200 that includes a number of amplification and reflected signal energy recovery systems 100A-100n positioned at regular or irregular intervals along a submarine optical transmission cable 224, in accordance with at least one embodiment of the present disclosure. Those skilled in the art will recognize that the system 200 has been depicted as a highly simplified point-to-point system for ease of explanation. It is to be understood the present invention may be incorporated into a wide variety of optical networks and systems.

The illustrated exemplary optical communication system 200 includes a transmitter 202 and a receiver 206 connected via an optical transmission path 204. At the transmitter 202, a plurality of separate optical signals may be generated by modulating data on each of a plurality of different wavelengths/channels within a signal bandwidth. The transmitter 202 may combine the separate channels into an aggregate optical signal and transmit the aggregate optical signal over the optical information path 204 to the receiver 206. Although the system 200 is illustrated as including a distinct transmitter 202 and receiver 206, those of ordinary skill in the art will recognize the transmitter 202 and receiver 206 may each be configured as a transceiver to facilitate bi-directional communication over the optical information path.

Depending on system characteristics and requirements, the optical transmission path 204 may include, optical transmission fiber 210, amplification and reflected signal energy recovery systems 100-1 through 100-N consistent with the present invention, optical filters, and other active and passive components. For clarity, only optical amplifiers 100-1, 100-2, 100-3, 100-(N-1), 100-N and optical transmission fiber 210 are illustrated in the optical information path 204. Optical amplifier configurations consistent with the present invention will be described in greater detail herein. Configurations for other components included in the transmission path are known to those of ordinary skill in the art.

System 200 may be configured as a long-haul system, e.g. having a length from the transmitter to receiver of more than about 600 km, and may span a body of water 212. When used to span a body of water, e.g. an ocean, optical amplifiers 100-1, 100-2, 100-3, 100-(N-1). 100-N may be seated on the ocean floor 214 and the transmission path 204 may span between beach landings 216, 218 to extend from the water 212 for coupling to the transmitter 202 and receiver 206. It will be appreciated that a plurality of optical transmission components may be coupled to the transmission path 204 and may be disposed beneath water and/or over land.

In general, the distance between optical amplifiers defines a transmission span length. The illustrated exemplary embodiment includes a plurality of spans, 224-1, 224-2, 223-3 . . . 224-(I-1), 224-I. Those or ordinary skill in the art will recognize that span lengths may vary significantly in a particular system. In a long-haul system, for example, some spans may be as short as 20 kilometers, while some spans may exceed 100 km. In view of the span length variation, signal attenuation varies from span-to-span.

Figure 3:
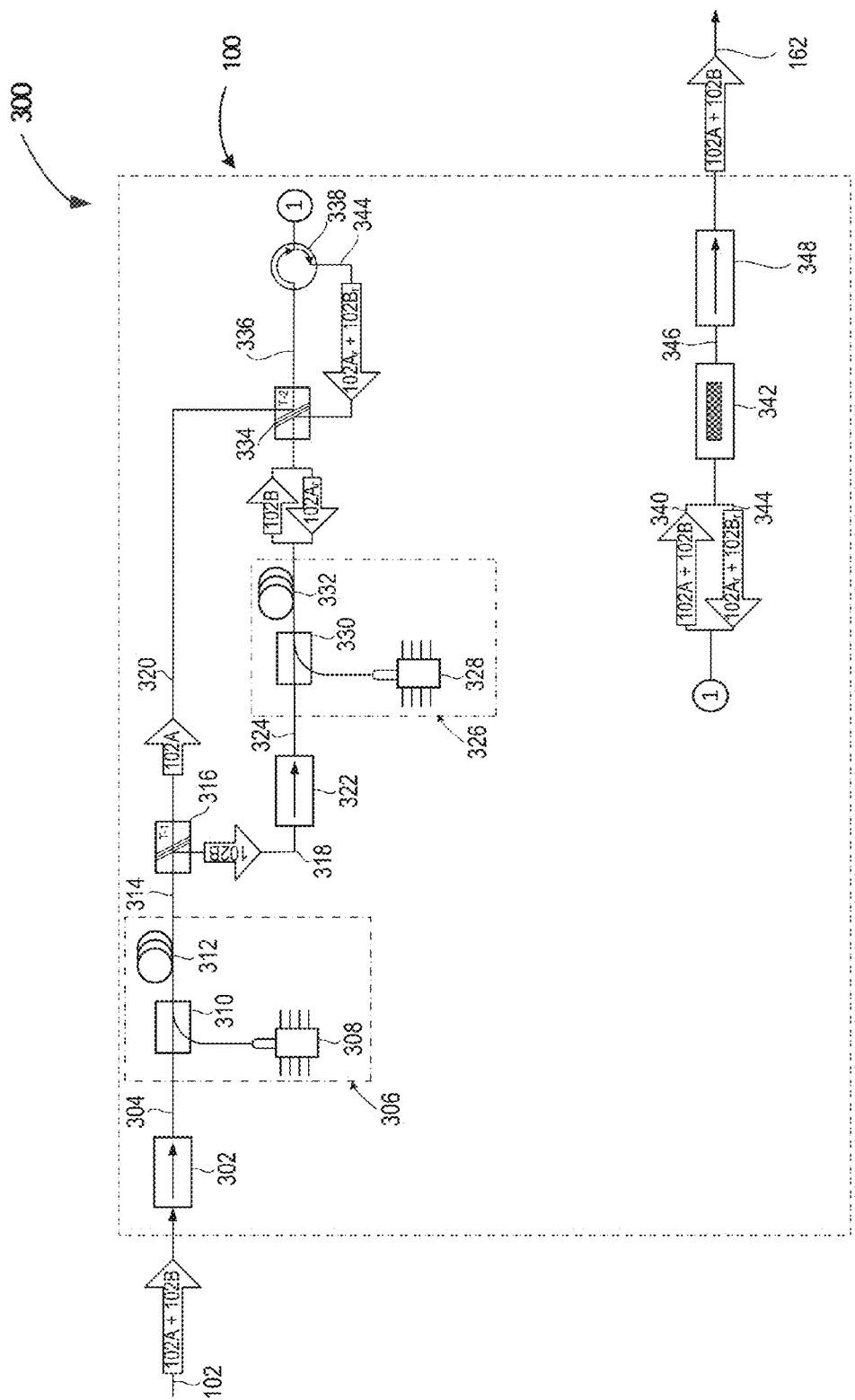
FIG. 3 is a schematic diagram of an illustrative amplification and reflected signal energy recovery system, in accordance with at least one embodiment of the present disclosure.

FIG. 3 is a schematic diagram of an illustrative amplification and reflected signal energy recovery system 300, in accordance with at least one embodiment of the present disclosure. An optical isolator 302 receives the incoming signal 102. In embodiments, the incoming signal 102 may include at least a first optical wavelength band signal portion 102A and a second optical wavelength band signal portion 102B. In embodiments, the first optical wavelength band signal portion 102A may include some or all of the wavelengths included in the C-band portion of the optical spectrum (1530 nm to 1565 nm). In embodiments, the second optical wavelength band signal portion 102B may include some or all of the wavelengths included in the L-band portion of the optical spectrum (1565 nm to 1625 nm). The optical isolator 302 permits the passage of the incoming optical signal 102 in a first direction and prevents the passage of any optical signal in the reverse (i.e., the incoming) direction. The optical isolator 302 may include any number and/or combination current or future devices and/or systems capable of permitting the passage of an optical signal in a first direction and blocking the passage of an optical signal in a second direction.

One or more amplifiers 306 may receive the output 304 from the optical isolator 302. In embodiments, the one or more amplifiers 306 may amplify some or all of the wavelengths in the first optical wavelength band signal portion 102A, some or all of the wavelengths in the second optical wavelength band signal portion 102B, or any combination thereof. In some implementations, the one or more amplifiers 306 may be selected, operated, and/or tuned such that the gain of at least the first optical wavelength band signal portion 102A is sufficiently great that no additional amplification of the first optical wavelength band signal portion 102A is needed. In embodiments, the one or more amplifiers 306 may be selected, operated, and/or tuned such that the gain of at least the second optical wavelength band signal portion 102B is insufficient and additional amplification of the second optical wavelength band signal portion 102B may be desirable.

In embodiments, the one or more amplifiers 306 may include one or more erbium doped fiber amplifiers (EDFAs). Each of the EDFAs may include a single or multi-stage EDFA, and may include one or more EDFA pump sources 308, a coupler 310, and an erbium-doped fiber segment 312. Various configurations for EDFA pump sources that may be controlled locally or remotely are known to those of ordinary skill in the art. Also, the pump sources may be coupled to the optical path 304 in a known configuration.

One or more type-1 signal splitter/combiners 316 receive the output 314 from the one or more amplifiers 306. Each type-1 signal splitter/combiner 316 may be identified in the figures by a small "T-1" designation that appears in the upper right-hand portion of the icon used to represent signal splitter 316. Each type-1 signal splitter 316 may be used to separate (i.e., demultiplex) or combine (i.e., multiplex) a number of optical signals. Each type-1 signal splitter/combiner 316 may be based on a dielectric thin film filter (TFF). The icon representing the type-1 signal splitter 316 depicts the thin film layer disposed within the signal splitter in a manner that represents one possible embodiment of such a device.

As used herein, each type-1 signal splitter/combiner 316 transmits the first optical wavelength band signal portion 102A and reflects the second optical wavelength band signal portion 102B. Thus, output 318 from the one or more type-1 signal splitter/combiners 316 may include some or all of the second optical wavelength band signal portion 102B of the incoming signal 102 and output 320 includes some or all of the first optical wavelength band signal portion 102A of the incoming signal 102.

The second optical wavelength band signal portion 102B passes through one or more optical isolators 322 each of which permit the unidirectional passage of optical signals. One or more amplifiers 326 may receive the output 324 of the one or more optical isolators 322. In embodiments, the one or more amplifiers 326 may amplify some or all of the wavelengths in the second optical wavelength band signal portion 102B. In some implementations, the one or more amplifiers 326 may be selected, operated, and/or tuned such that no additional amplification of the second optical wavelength band signal portion 102B is needed.

In embodiments, the one or more amplifiers 326 may include one or more erbium doped fiber amplifiers (EDFAs). Each of the EDFAs may include a single or multi-stage EDFA, and may include one or more EDFA pump sources 328, a coupler 330, and an erbium-doped fiber segment 332. Various configurations for EDFA pump sources that may be controlled locally or remotely are known to those of ordinary skill in the art. Also, the pump sources may be coupled to the optical path 324 in any known configuration.

One or more type-2 signal splitter/combiners 334 may receive the output from the one or more amplifiers 326. Each type-2 signal splitter/combiner 334 may be identified in the figures by a small "T-2" designation that appears in the upper right-hand portion of the icon used to represent the type-2 signal splitter/combiner 334. Each type-2 signal splitter/combiner 334 may be used to separate (i.e., demultiplex) or combine (i.e., multiplex) a number of optical signals. Each type-2 signal splitter/combiner 334 may be based on a dielectric thin film filter (TFF) that reflects one or more portions of the optical spectrum and transmits one or more other portions of the optical spectrum. The icon representing the type-2 signal splitter/combiner 334 depicts the thin film layer disposed within the signal splitter in a manner that represents one possible embodiment of such a device.

As used herein, each type-2 signal splitter/combiner 334 transmits the second optical wavelength band signal portion 102B and reflects the first optical wavelength band signal portion 102A. Thus, output 336 from the one or more type-2 signal splitter/combiners 334 includes some or all of both the first optical wavelength band signal portion 102A (i.e., output 320 from the one or more type-1 splitters 316) and some or all of the second optical wavelength band signal portion 102B (i.e., output from the one or more amplifiers 326).

One or more optical circulators 338 may receive the output 336 from the one or more type-2 signal splitter/combiners 334. The one or more optical circulators 338 separate optical signals travelling in different directions along an optical fiber. As depicted in FIG. 3, the one or more optical circulators 338 is a three-port device designed such that an optical signal entering one port exits from the next port as identified by the directional arrows within the optical circulator icon.

One or more gain flattening filters (GFF) 342 receive the output 340 from the one or more optical circulators 338. In at least some implementations, the output 340 may include all or a portion of the first optical wavelength band signal portion 102A and all or a portion of the second optical wavelength band signal portion 102B. The one or more GFFs 342 pass optical signals falling within the first optical wavelength band signal portion 102A and the second optical wavelength band signal portion 102B and reject optical signals falling outside either the first optical wavelength band signal portion 102A or the second optical wavelength band signal portion 102B.

In at least some implementations, the one or more GFFs 342 may include one or more Short Period Fiber Bragg Grating (SP-FBG) filters capable of providing accurate shaping of the output 340 from the one or more optical circulators 338. In at least some implementations, the one or more GFFs 342 may produce an output signal 346 that includes at least the filtered and amplified first optical wavelength band signal portion 102A and at least the filtered and amplified second optical wavelength band signal portion 102B.

In some implementations, the one or more GFFs 342 may reflect a portion of the incident signals as a reflected output signal 344 that is directed in a reverse direction, back toward the one or more optical circulators 338. The reflected output signal 344 may include energy in the form of reflected optical signals in the first optical wavelength band signal portion 102A and/or the second optical wavelength band signal portion 102B. In addition, the reflected output signal 344 may include energy in the form of amplified spontaneous emission (ASE) noise.

The one or more optical circulators 338 receive the reflected output signal 344 from the one or more GFFs 342 and pass the reflected optical signal to the one or more type-2 signal splitter/combiners 334. The one or more type-2 signal splitter/combiners 334 reflect the optical wavelengths in the first optical wavelength band signal portion 102A and direct the reflected optical wavelengths in the first optical wavelength band signal portion 102A to the one or more amplifiers 326. The one or more amplifiers 326 may use at least a portion of the energy in the reflected first optical wavelength band signal portion 102A to increase the energy of the second optical wavelength band signal portion 102B introduced to the one or more amplifiers 326 via the output signal 318.

The output 346 from the one or more GFFs 342 includes an amplified first optical wavelength band signal portion 102A and an amplified second optical wavelength band signal portion 102B. One or more optical isolators 348 receives the output 346 from the one or more GFFs 342 and passes the output as output signal 162. The output signal 162 exiting the one or more optical isolators 348 includes the amplified first optical wavelength band signal portion 102A and the amplified second optical wavelength band signal portion 102B.

Figure 4:
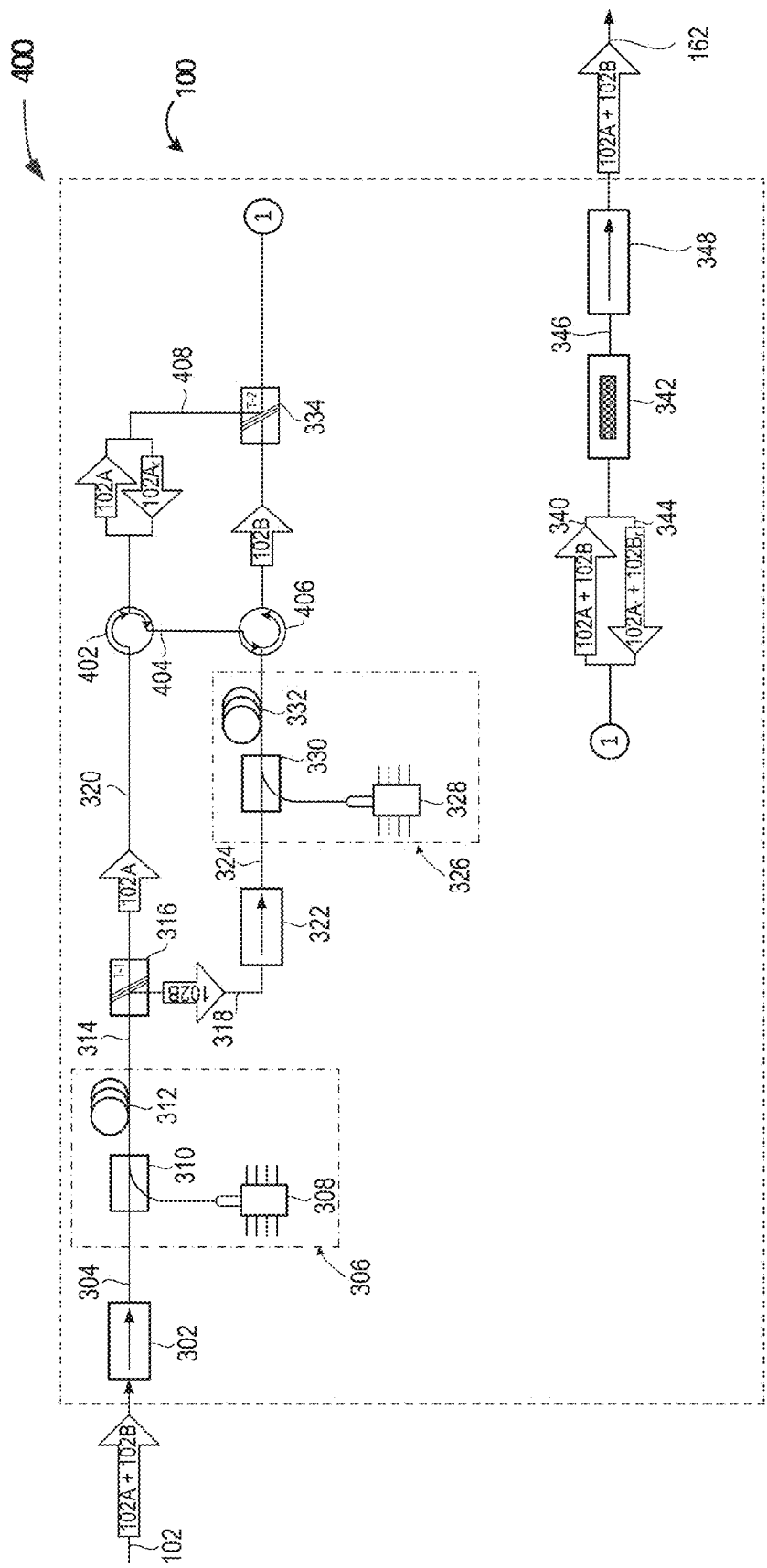
FIG. 4 is a schematic diagram of another illustrative amplification and reflected signal energy recovery system, in accordance with at least one embodiment of the present disclosure.

FIG. 4 is a schematic diagram of another illustrative amplification and reflected signal energy recovery system 400, in accordance with at least one embodiment of the present disclosure. As depicted in FIG. 4, the one or more type-2 signal splitter/combiners 334 directly receive the optical signal 344 reflected by the one or more GFFs 342. The reflected output 408 from the one or more type-2 signal splitter/combiners 334 includes at least a portion of the reflected first optical wavelength band signal portion $102A_r$. Note that in FIGS. 4 through 14 elements may be referred to in the singular, such should be considered to represent one or more of the elements as may be required by the system depicted in the respective figure.

The optical circulator 402 receives the reflected first optical wavelength band signal portion $102A_r$ and outputs 404 all or a portion of the reflected first optical wavelength band signal portion $102A_r$.

The optical circulator 406 receives the reflected first optical wavelength band signal portion $102A_r$ from the optical circulator 402 and outputs at least a portion of the reflected first optical wavelength band signal portion $102A_r$ to the amplifier 326. The amplifier 326 may add at least a portion of the energy in the reflected first optical wavelength band signal portion $102A_r$ to the second optical wavelength band signal portion 102B.

Figure 5:
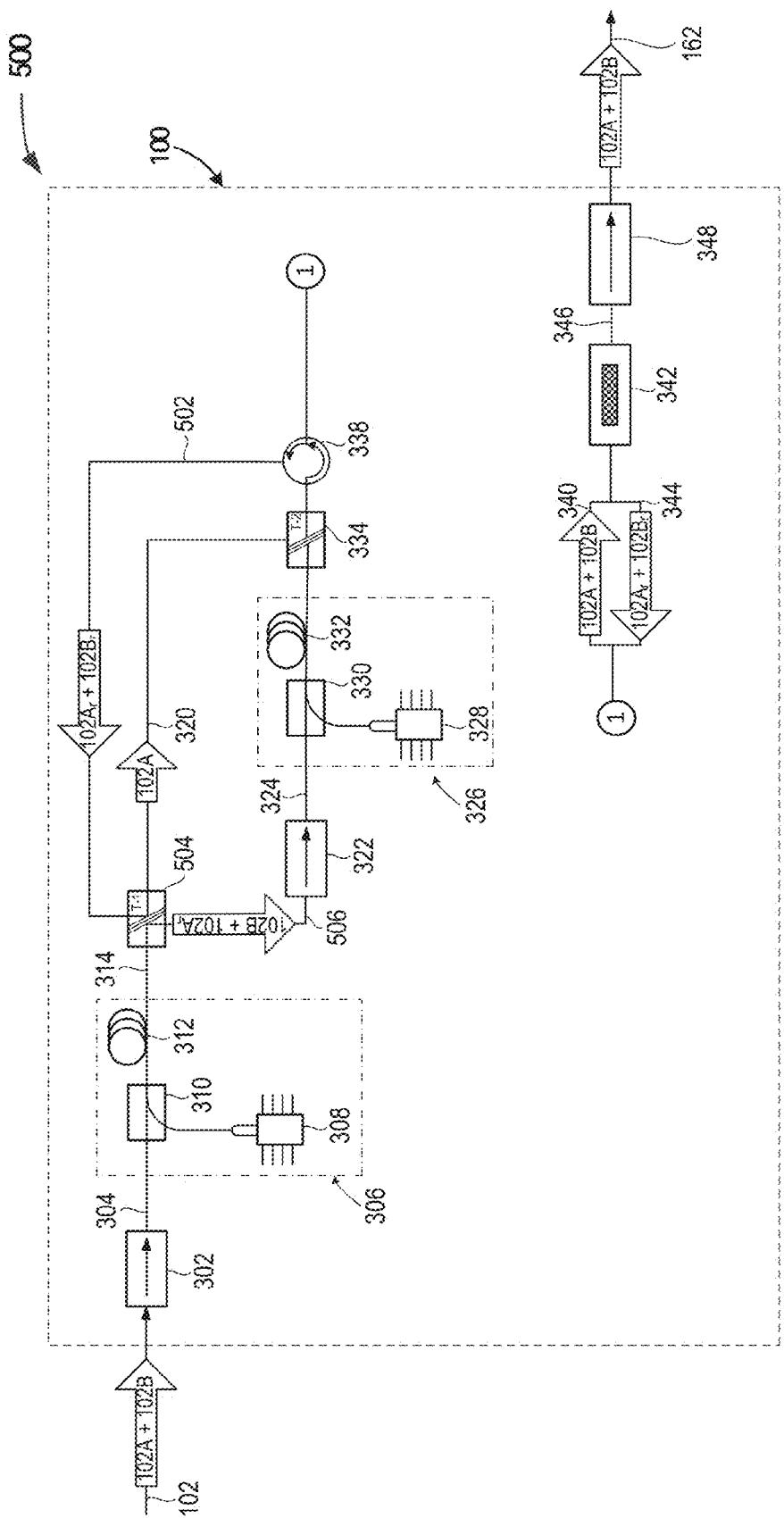
FIG. 5 is a schematic diagram of another illustrative amplification and reflected signal energy recovery system, in accordance with at least one embodiment of the present disclosure.

FIG. 5 is a schematic diagram of another illustrative amplification and reflected signal energy recovery system 500, in accordance with at least one embodiment of the present disclosure. As depicted in FIG. 5, the optical circulator 338 receives the optical signal 344 reflected by the GFF 342. In embodiments, the optical signal 344 reflected by the GFF 342 may include a reflected portion of the first optical wavelength band signal portion $102A_r$, a reflected portion of the second optical wavelength band signal portion $102B_r$, and amplified spontaneous emission (ASE) noise rejected by the one or more GFFs 342.

The output 502 from the optical circulator 338 is returned to a four-port, type-1, optical splitter/combiner 504. Output 506 from the four-port, type-1, optical splitter/combiner 504 may include the reflected portion of the second optical wavelength band signal portion 102B included in the incoming signal 102 and at least a portion of the reflected first optical wavelength band signal portion $102A_r$. The reflected first optical wavelength band signal portion $102A_r$ passes through the isolator 322 and is received by the amplifier 326. At least a portion of the energy carried by the reflected first optical wavelength band signal portion $102A_r$ may then be used by the amplifier 326 to boost the gain of the second optical wavelength band signal portion 102B of the incoming signal 102.

Figure 6:
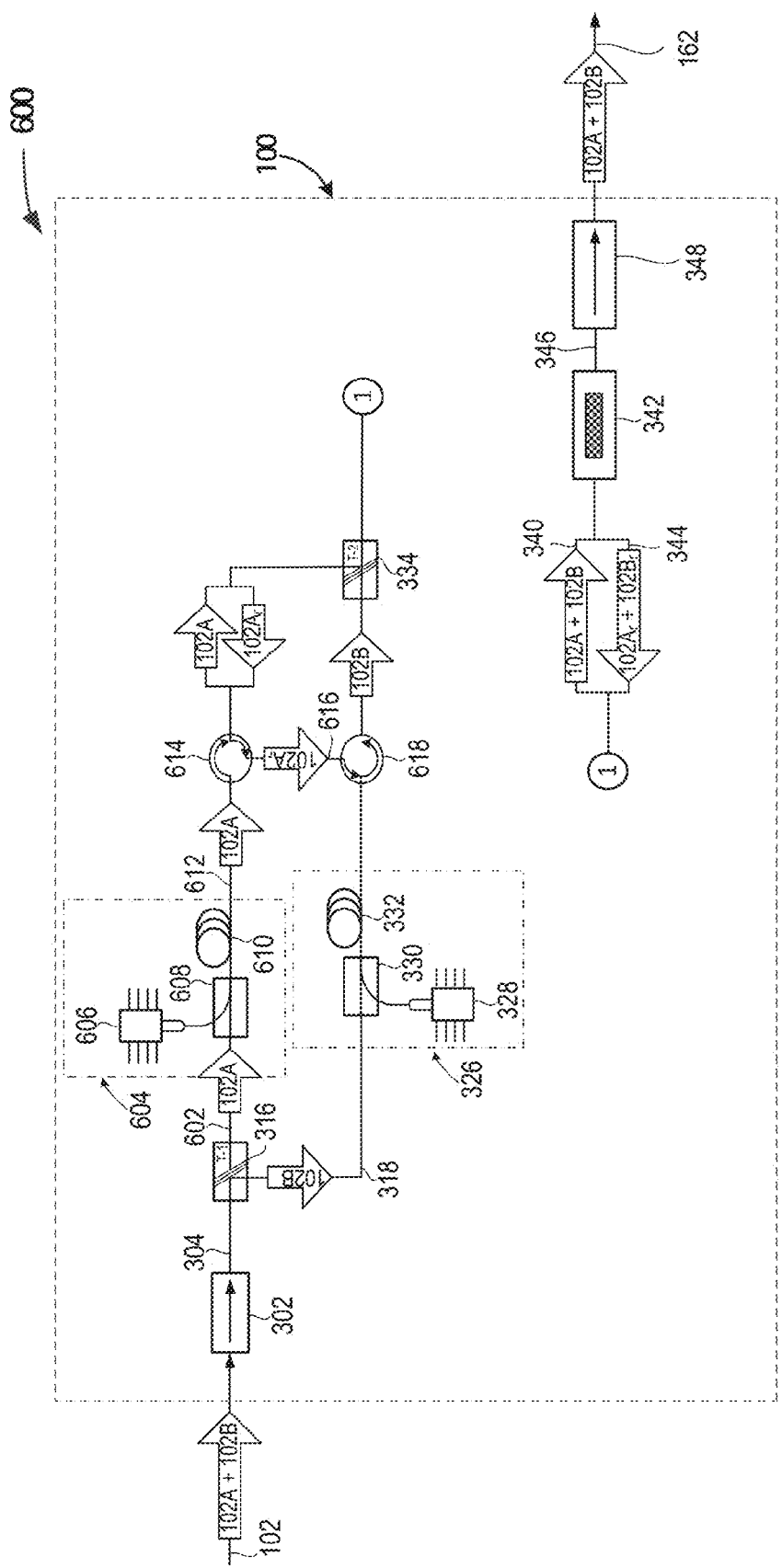
FIG. 6 is a schematic diagram of another illustrative amplification and reflected signal energy recovery system, in accordance with at least one embodiment of the present disclosure.

FIG. 6 is a schematic diagram of another illustrative amplification and reflected signal energy recovery system 600, in accordance with at least one embodiment of the present disclosure. As depicted in FIG. 6, the incoming signal 102 is split into at least the first optical wavelength band signal portion 102A and the second optical wavelength band signal portion 102B prior to amplification. The type-1 splitter/combiner 316 receives the unamplified incoming signal 102. The output 602 from the type-1 splitter/combiner 316 may include at least the first optical wavelength band signal portion 102A. The output 318 from the type-1 splitter/combiner 316 may include at least the second optical wavelength band signal portion 102B.

The amplifier 604 receives the output 602. The output 602 may include at least the first optical wavelength band signal portion 102A, from the type-1 splitter/combiner 316. In embodiments, the amplifier 602 may amplify some or all of the wavelengths in the first optical wavelength band signal portion 102A. In some implementations, the amplifier 306 may be selected, operated, and/or tuned such that the gain of at least the first optical wavelength band signal portion 102A is sufficiently increased such that no additional amplification of the first optical wavelength band signal portion 102A is needed.

In embodiments, the amplifier 604 may include an erbium doped fiber amplifier (EDFA). In embodiments, each EDFA may include either a single-stage EFDA or multi-stage EDFA, and may include an EDFA pump source 606, a coupler 608, and an erbium-doped fiber segment 610. Various control configurations for the EDFA pump source 606, including local or remote control, are known to those of ordinary skill in the art. Also, the pump source 606 may be coupled to the optical path 602 in any known configuration.

The optical circulator 614 receives the output 612 from the amplifier 604. The optical circulator 614 may pass at least a portion of the first optical wavelength band signal portion 102A received from the amplifier 604 to the three-port, type-2, splitter/combiner 334.

In embodiments, the reflected optical signal 344 produced by the GFF 342 may include a reflected portion of the first optical wavelength band signal portion $102A_r$, a reflected portion of the second optical wavelength band signal portion $102B_r$, and amplified spontaneous emission (ASE) noise rejected by the GFF 342.

The three-port, type-2, splitter/combiner 334 receives the reflected first optical signal 344 from the GFF 342. The three-port, type-2, splitter/combiner 334 reflects at least a portion of the reflected first optical wavelength band signal portion $102A_r$ back to the optical circulator 614. The optical circulator 614 provides an output 616 that includes at least a portion of the received reflected first optical wavelength band signal portion $102A_r$.

The optical circulator 618 may receive at least a portion of the output 616 from the optical circulator 614. The optical circulator 618 provides an output that includes at least a portion of the reflected first optical wavelength band signal portion $102A_r$ to the amplifier 326.

The amplifier 326 receives the reflected first optical wavelength band signal portion $102A_r$. In embodiments, the amplifier 326 may use at least a portion of the energy carried by the reflected first optical wavelength band signal portion $102A_r$ to increase the gain of the second optical wavelength band signal portion 102B received from the type-1 optical splitter/combiner 316.

Figure 7:
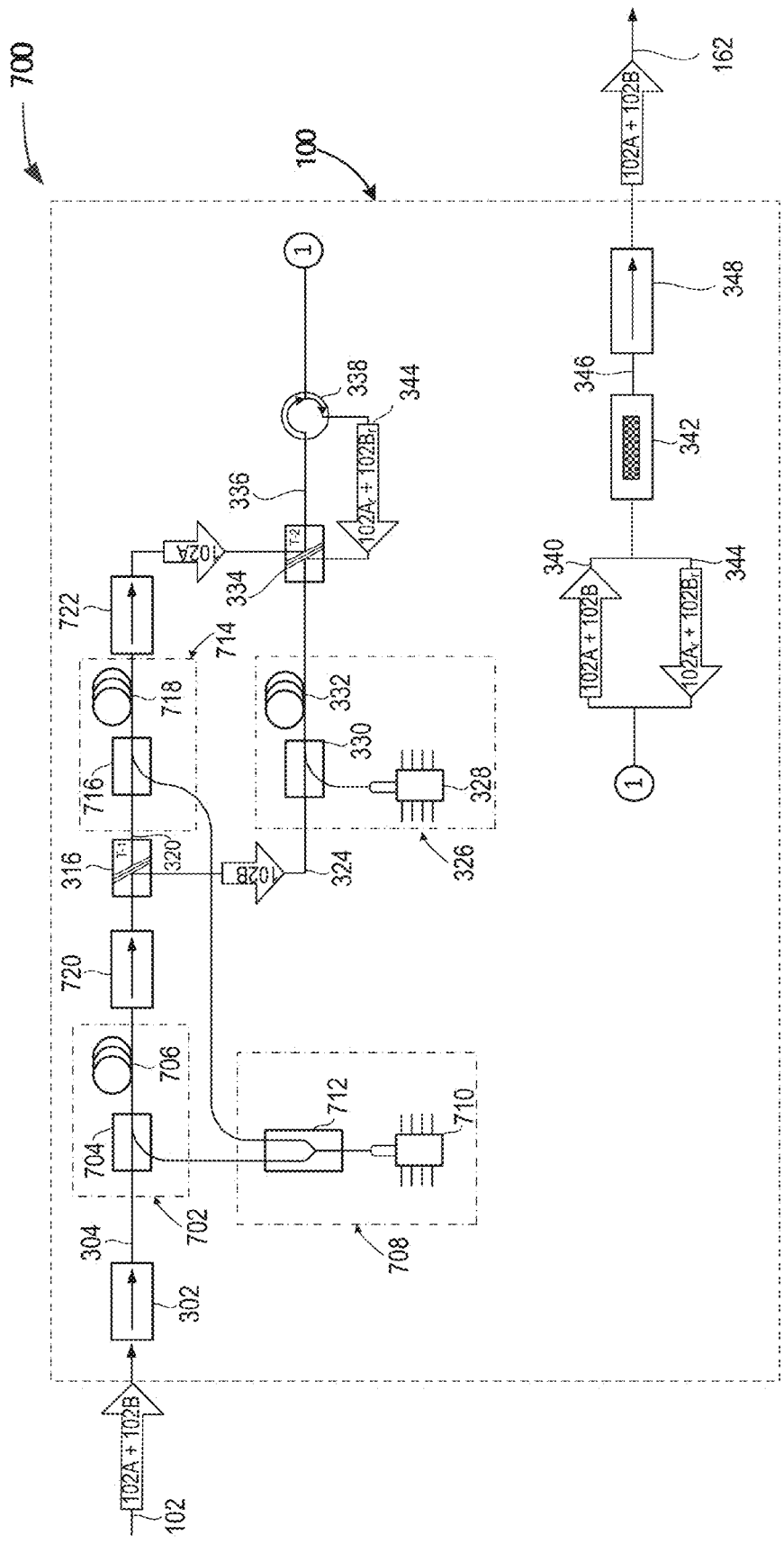
FIG. 7 is a schematic diagram of another illustrative amplification and reflected signal energy recovery system, in accordance with at least one embodiment of the present disclosure.

FIG. 7 is a schematic diagram of another illustrative amplification and reflected signal energy recovery system 700, in accordance with at least one embodiment of the present disclosure. As depicted in FIG. 7, the amplifier 702 receives the input signal 102. The input signal 102 may include at least the first optical wavelength band signal portion 102A and the second optical wavelength band signal portion 102B.

In embodiments, the amplifier 702 may amplify some or all of the wavelengths in the first optical wavelength band signal portion 102A, some or all of the wavelengths in the second optical wavelength band signal portion 102B, or any combination thereof. In some implementations, the amplifier 702 may be selected, operated, and/or tuned such that the gain of at least the first optical wavelength band signal portion 102A is insufficient and additional amplification of the first optical wavelength band signal portion 102A may be desirable. In embodiments, the amplifier 702 may be selected, operated, and/or tuned such that the gain of at least the second optical wavelength band signal portion 102B is insufficient and additional amplification of the second optical wavelength band signal portion 102B may be desirable. In embodiments, the amplifier 702 may include an erbium doped fiber amplifier (EDFA). Each EDFA may consist of either a single-stage EDFA or a multi-stage EDFA, and may include a coupler 704, and an erbium-doped fiber segment 706.

In some implementations, the amplifier 702 may be operably coupled to a single EDFA pump source 708 that includes an EDFA pump 710 and an optical splitter 712 may be used to power at least the amplifier 702. Various configurations for EDFA pump sources that may be controlled locally or remotely are known to those of ordinary skill in the art. Also, the pump sources may be coupled to the optical path in any known configuration. The optical isolator 720 may receive at least a portion of the output provided by the amplifier 702.

In embodiments, the three-port, type-1 optical splitter/combiner 316 may receive the amplified input signal 102 from the optical isolator 720. The amplifier 714 may receive all or a portion of the output 320 from the three-port, type-1, optical splitter/combiner 316. The output 320 may include at least the first optical wavelength band signal portion 102A of incoming signal 102.

In embodiments, the amplifier 714 may amplify some or all of the wavelengths in the first optical wavelength band signal portion 102A. In some implementations, the amplifier 714 may be selected, operated, and/or tuned such that the gain of at least the first optical wavelength band signal portion 102A sufficient and additional amplification of the first optical wavelength band signal portion 102A may be unnecessary. In embodiments, the amplifier 714 may include at least one erbium doped fiber amplifier (EDFA). Each EDFA may consist of either a single-stage EDFA or a multi-stage EDFA, and may include a coupler 716, and an erbium-doped fiber segment 718.

In some implementations, the amplifier 714 may be operably coupled to a single EDFA pump source 708 that includes at least one EDFA pump 710 and an optical splitter 712 may be used to power the amplifier 702. Various configurations for EDFA pump sources that may be controlled locally or remotely are known to those of ordinary skill in the art. Also, the pump sources may be coupled to the optical path in any known configuration. In some implementations, the optical isolator 722 may receive at least a portion of the amplified first optical wavelength band signal portion 102A provided by the amplifier 714.

In embodiments, the amplifier 326 receives the reflected first optical wavelength band signal portion $102A_r$ via the type-2 optical splitter/combiner 334. In embodiments, the amplifier 326 may use at least a portion of the energy carried by the reflected first optical wavelength band signal portion $102A_r$ to increase the gain of the second optical wavelength band signal portion 102B received from the type-1 optical splitter/combiner 316.

Figure 8:
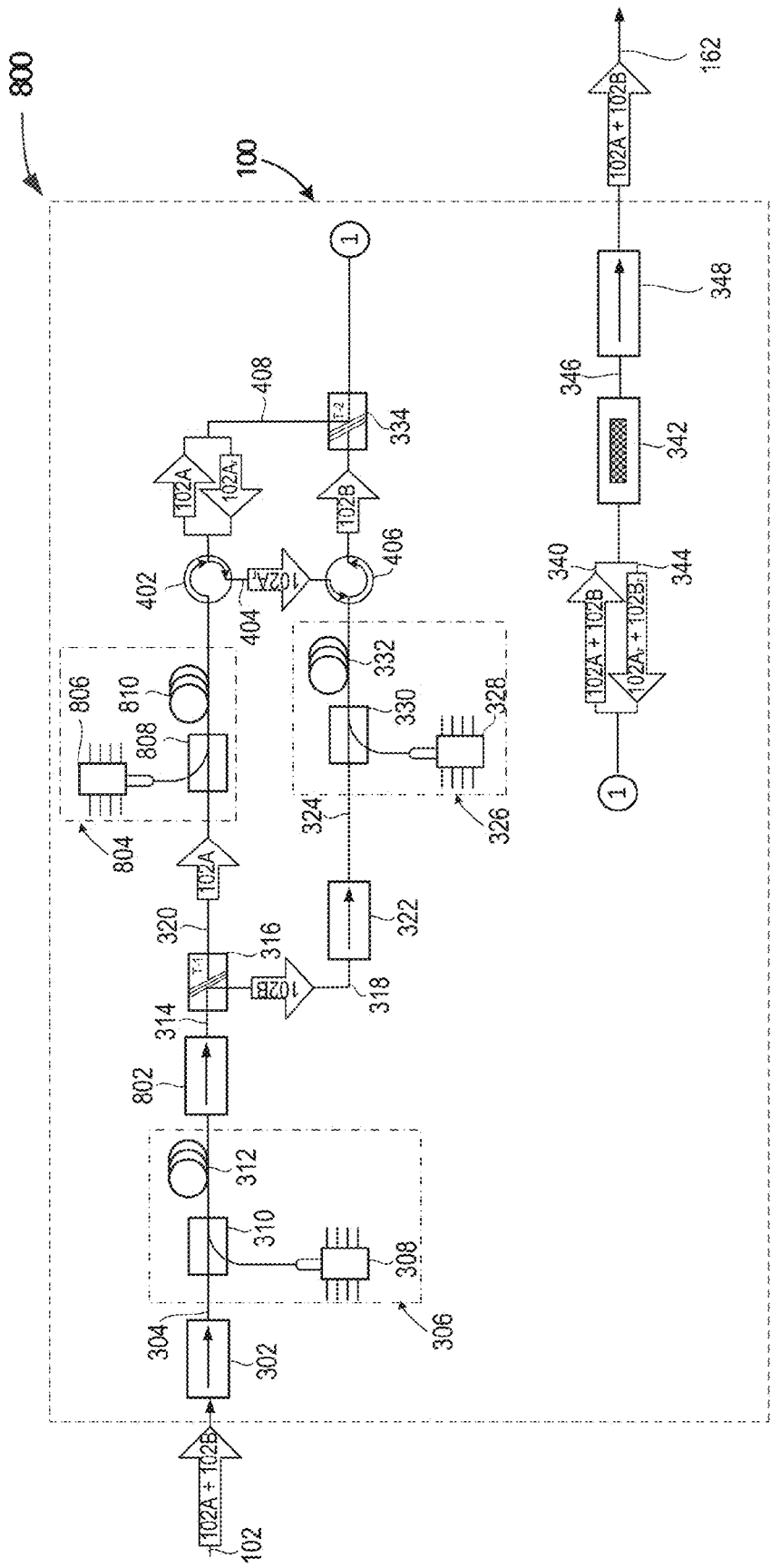
FIG. 8 is a schematic diagram of another illustrative amplification and reflected signal energy recovery system, in accordance with at least one embodiment of the present disclosure.

FIG. 8 is a schematic diagram of another illustrative amplification and reflected signal energy recovery system 800, in accordance with at least one embodiment of the present disclosure. As depicted in FIG. 8, the amplifier 306 may increase the gain of the incoming signal 102 prior to splitting the first optical wavelength band signal portion 102A from the second optical wavelength band signal portion 102B. After splitting, the amplifier 804 may increase the gain of the first optical wavelength band signal portion 102A and the amplifier 326 may increase the gain of the second optical wavelength band signal portion 102B.

In embodiments, the amplifier 306 may amplify some or all of the wavelengths in the first optical wavelength band signal portion 102A, some or all of the wavelengths in the second optical wavelength band signal portion 102B, or any combination thereof. In some implementations, the amplifier 306 may be selected, operated, and/or tuned such that the gain of at least the first optical wavelength band signal portion 102A is insufficient and additional amplification of the first optical wavelength band signal portion 102A may be desirable. In embodiments, the amplifier 306 may be selected, operated, and/or tuned such that the gain of at least the second optical wavelength band signal portion 102B is insufficient and additional amplification of the second optical wavelength band signal portion 102B may be desirable.

The amplifier 804 may receive all or a portion of the output 320 from the type-1 optical signal splitter/combiners 316. In embodiments, the amplifier 804 may amplify some or all of the wavelengths in the first optical wavelength band signal portion 102A. In some implementations, the amplifier 804 may be selected, operated, and/or tuned such that no additional amplification of the first optical wavelength band signal portion 102A is needed.

In embodiments, the amplifier 804 may include at least one erbium doped fiber amplifier (EDFA). Each EDFA may consist of either a single-stage EDFA or a multi-stage EDFA, and may include at least one EDFA pump source 806, a coupler 808, and an erbium-doped fiber segment 810. Various configurations for EDFA pump sources that may be controlled locally or remotely are known to those of ordinary skill in the art. Also, the pump sources may be coupled to the optical path 320 in any known configuration.

The amplifier 326 receives at least a portion of the reflected first optical wavelength band signal portion 102A$_r$ via the type-2 splitter/combiner 334, optical circulator 402, and optical circulator 406. In embodiments, the amplifier 326 may use at least a portion of the energy carried by the reflected first optical wavelength band signal portion 102A$_r$ to increase the gain of the second optical wavelength band signal portion 102B received from the type-1 optical splitter/combiner 316.

Figure 9:
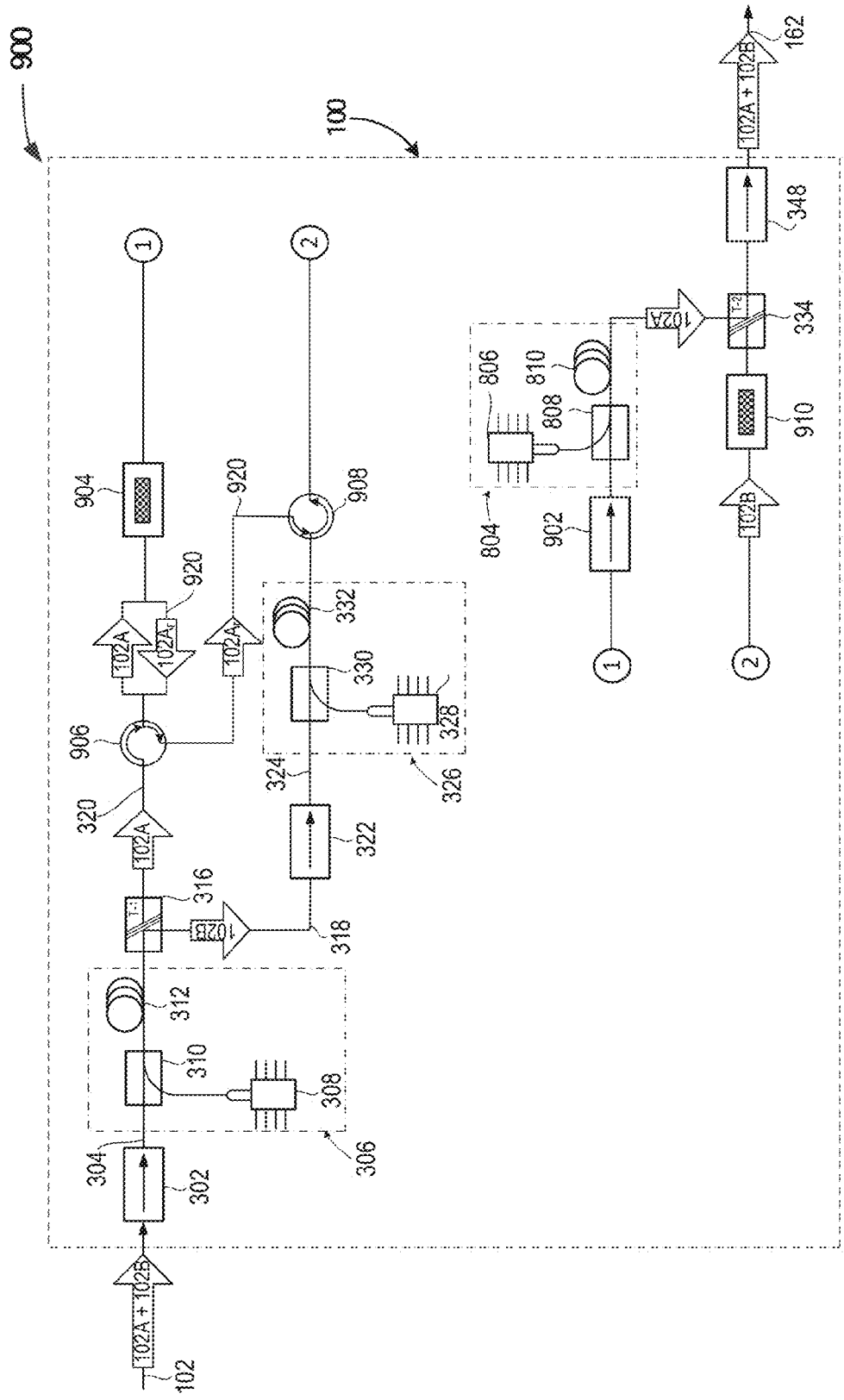
FIG. 9 is a schematic diagram of another illustrative amplification and reflected signal energy recovery system, in accordance with at least one embodiment of the present disclosure.

FIG. 9 is a schematic diagram of another illustrative amplification and reflected signal energy recovery system 900, in accordance with at least one embodiment of the present disclosure. As depicted in FIG. 9, the amplifier 306 may increase the gain of the incoming signal 102 prior to splitting the first optical wavelength band signal portion 102A from the second optical wavelength band signal portion 102B. After splitting, the amplifier 804 may increase the gain of the first optical wavelength band signal portion 102A and the amplifier 326 may increase the gain of the second optical wavelength band signal portion 102B. In addition, the split first optical wavelength band signal portion 102A may be passed through a first gain flattening filter (GFF) 904 and the split second optical wavelength band signal portion 102B may be passed through a second gain flattening filter (GFF) 910. Such an arrangement may advantageously permit the selection of at least one GFF 904 demonstrating favorable bandpass characteristics for the first optical wavelength band signal portion 102A and at least one GFF 910 demonstrating favorable bandpass characteristics for the second optical wavelength signal portion 102B. As depicted in FIG. 9, the filtered, amplified, first optical wavelength band signal portion 102A and the filtered, amplified second optical wavelength band signal portion 102B may be combined to provide the output signal 162.

In embodiments, the split first optical wavelength band signal portion 102A may pass through an optical circulator 906 prior to reaching the GFF 904. The GFF 904 may pass optical signals falling within the first optical wavelength band signal portion 102A and may reject or otherwise attenuate optical signals falling outside the first optical wavelength band signal portion 102A.

In at least some implementations, the GFF 904 may include one or more Short Period Fiber Bragg Grating (SP-FBG) filters capable of providing accurate shaping of the output 320 from the optical circulators 906. In at least some implementations, the output signal from the GFF 904 may be passed to the optical isolators 902.

In some implementations, the GFF 904 may reflect a portion of the incident signal as a reflected output signal 920 that is directed in a reverse direction, back toward the optical circulator 906. The reflected output signal 920 may include energy in the form of reflected optical signals in the first optical wavelength band signal portion 102A and may include additional energy in the form of amplified spontaneous emission (ASE) noise.

The optical circulator 906 separates optical signals travelling in different directions along an optical fiber. As depicted in FIG. 9, in embodiments, the optical circulator 906 may include a three-port device designed such that an optical signal entering one port exits from the next port as identified by the directional arrows within the optical circulator icon.

The reflected first optical wavelength band signal portion 102A$_r$ enters the optical circulator 906. All or a portion of the reflected first optical wavelength band signal portion 102A$_r$ exits the optical circulator 904 as an output 922 which is subsequently introduced to the optical circulator 908. The optical circulators 908 output the reflected first optical wavelength band signal portion 102A$_r$ to the amplifier 326 used to increase the gain of at least the second optical wavelength band signal portion 102B. Within the amplifier 326, some or all of the energy carried by the reflected first optical wavelength band signal portion 102A$_r$ may be used to boost the gain of the second optical wavelength band signal portion 102B, thereby beneficially reducing the energy consumption of the amplifier 326 by a commensurate amount.

In embodiments, the split second optical wavelength band signal portion 102B may pass through the optical circulator 908 to the GFF 910. The GFF 910 may pass optical signals falling within the second optical wavelength band signal portion 102B and may reject or otherwise attenuate optical signals falling outside the second optical wavelength band signal portion 102B.

In at least some implementations, the GFF 910 may include at least one Short Period Fiber Bragg Grating (SP-FBG) filters capable of providing accurate shaping of the second optical wavelength band signal portion 102B. In at least some implementations, the output signal from the GFF 904 may be passed to the type-2 optical signal splitter/combiner 342 where the amplified, filtered, first optical wavelength band signal portion 102A is combined with the amplified, filtered, second optical wavelength band signal portion 102B.

Figure 10:
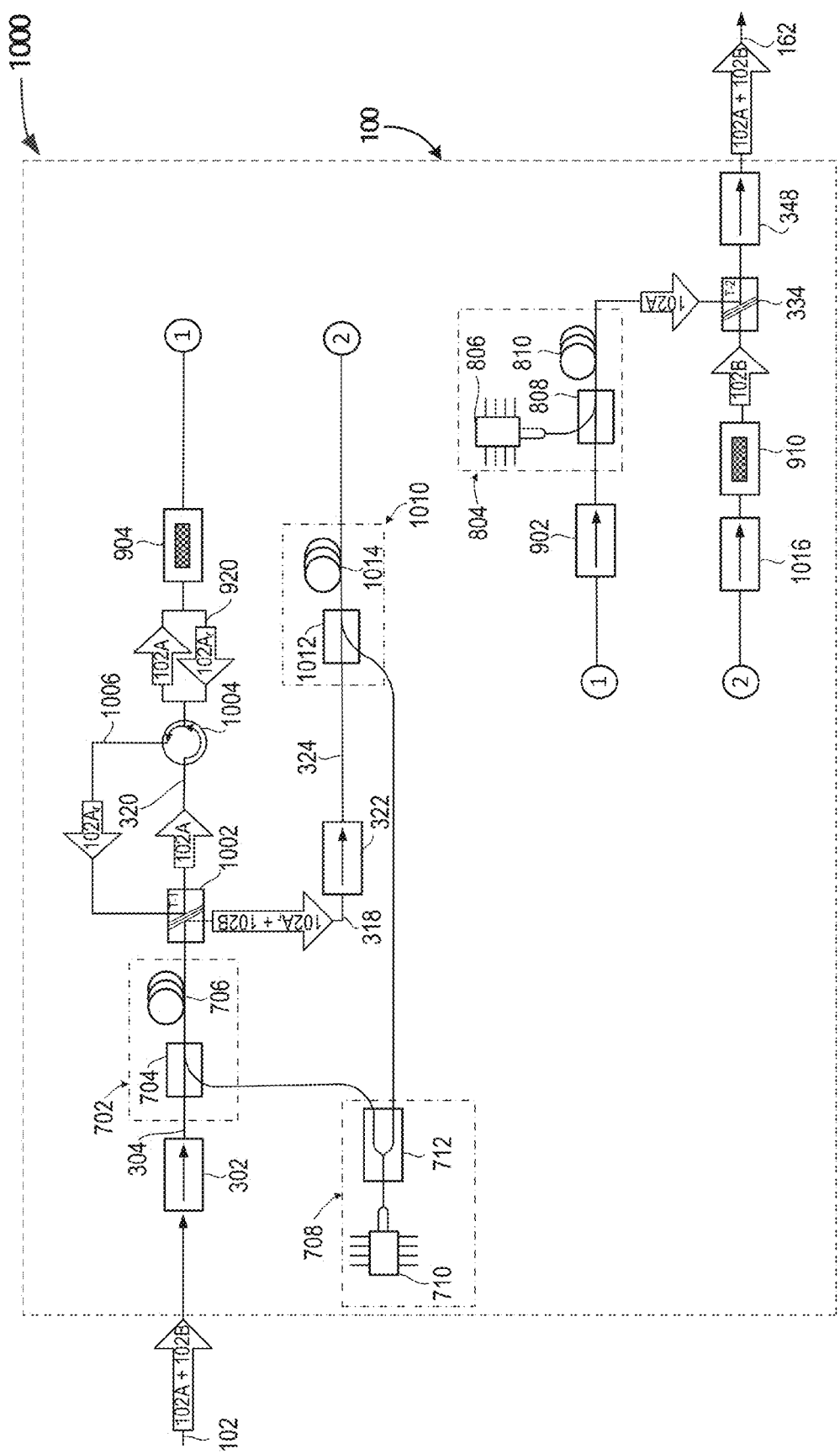
FIG. 10 is a schematic diagram of another illustrative amplification and reflected signal energy recovery system, in accordance with at least one embodiment of the present disclosure.

FIG. 10 is a schematic diagram of another illustrative amplification and reflected signal energy recovery system 1000, in accordance with at least one embodiment of the present disclosure. As depicted in FIG. 10, the amplifier 702 may increase the gain of the incoming signal 102 prior to splitting the first optical wavelength band signal portion 102A from the second optical wavelength band signal portion 102B. After splitting, the first optical wavelength band signal portion 102A may be filtered using at least one gain flattening filter (GFF) 904 and amplified using at least one amplifier 804. After splitting, the second optical wavelength band signal portion 102B may be amplified using at least one amplifier 1010 and filtered using at least one gain flattening filter (GFF) 910. Such an arrangement may advantageously permit the selection of a GFF 904 demonstrating favorable bandpass characteristics for the first optical wavelength band signal portion 102A and a GFF 910 demonstrating favorable bandpass characteristics for the second optical wavelength signal portion 102B. As depicted in FIG. 10, the filtered, amplified, first optical wavelength band signal portion 102A and the filtered, amplified second optical wavelength band signal portion 102B may be combined to provide the output signal 162.

As depicted in FIG. 10, the input signal 102 may be amplified using one or more amplifiers 702 prior to splitting. A four-port, type-1, optical signal splitter/combiner 1002 may receive the amplified input signal 102 from the amplifier 702. All or a portion of the first optical wavelength band signal portion 102A may exit the four-port, type-1, optical signal splitter/combiner 1002 via output 320. All or a portion of the second optical wavelength band signal portion 102B may exit the four-port, type-1, optical signal splitter/combiner 1002 via output 318.

The first optical wavelength band signal portion 102A exits the four-port, type-1, optical signal splitter/combiners 1002, passes through the three-port circulator 1004 and the GFF 904. The GFF 904 may pass optical signals falling within the first optical wavelength band signal portion 102A and may reject or otherwise attenuate optical signals falling outside the first optical wavelength band signal portion 102A.

The portion of the first optical wavelength band signal portion 102A$_r$ reflected by the GFF 904 enters the optical circulator 1004. The optical circulator 1004 separates the reflected first optical wavelength band signal portion 102A$_r$ and forwards the reflected first optical wavelength band signal portion 102A$_r$ via output 1006 to the four-port, type-1, optical signal splitter/combiner 1002. The four-port, type-1, optical signal splitter/combiner 1002 combines the reflected first optical wavelength band signal portion 102A$_r$ with the split second optical wavelength band signal portion 102B and forwards, via output 318, the combined reflected first optical wavelength band signal portion 102A$_r$ and second optical wavelength band signal portion 102B to the amplifier 1010.

The amplifier 1010 uses at least a portion of the energy carried by the reflected first optical wavelength band signal portion 102A$_r$ to amplify or otherwise increase the gain of the second optical wavelength band signal portion 102B. The amplified second optical wavelength band signal portion 102B exits the amplifier 1010, passes through the optical isolator 1016, through the GFF 910, and enters the type-2 optical signal splitter/combiner 342. Within the type-2 optical signal splitter/combiner 342 the amplified first optical wavelength band signal portion 102A and the amplified second optical wavelength band signal portion 102B are combined to provide output signal 162.

Figure 11:
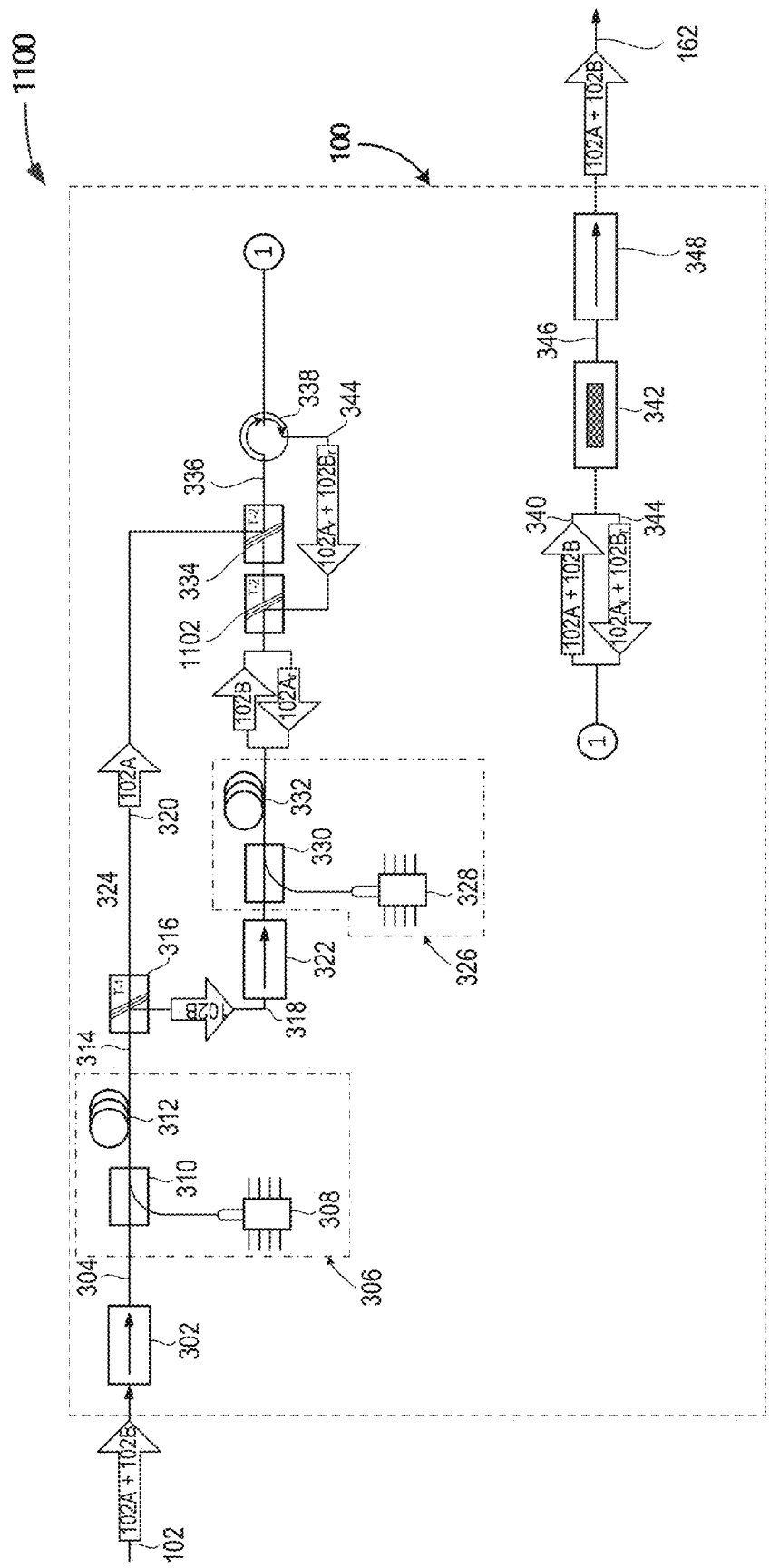
FIG. 11 is a schematic diagram of another illustrative amplification and reflected signal energy recovery system, in accordance with at least one embodiment of the present disclosure.

FIG. 11 is a schematic diagram of another illustrative amplification and reflected signal energy recovery system 1100, in accordance with at least one embodiment of the present disclosure. As depicted in FIG. 11, the output from the amplifier 326 may pass through a three-port, type-2, optical signal splitter/combiner 1102 and through a sequential three-port, type-2, optical signal splitter/combiner 334. The first optical wavelength band signal portion 102A$_r$ and the second optical wavelength band signal portion 102B$_r$ reflected from the one or more GFFs 342 is introduced to the three-port, type-2, optical signal splitter/combiner 1102 where the first optical wavelength band signal portion 102A$_r$ is reflected back to the amplifier 326. At least a portion of the energy carried by the reflected first optical wavelength band signal portion 102A$_r$ may be used by the amplifier 326 to amplify or otherwise boost the gain of the second optical wavelength band signal portion 102B.

Figure 12:
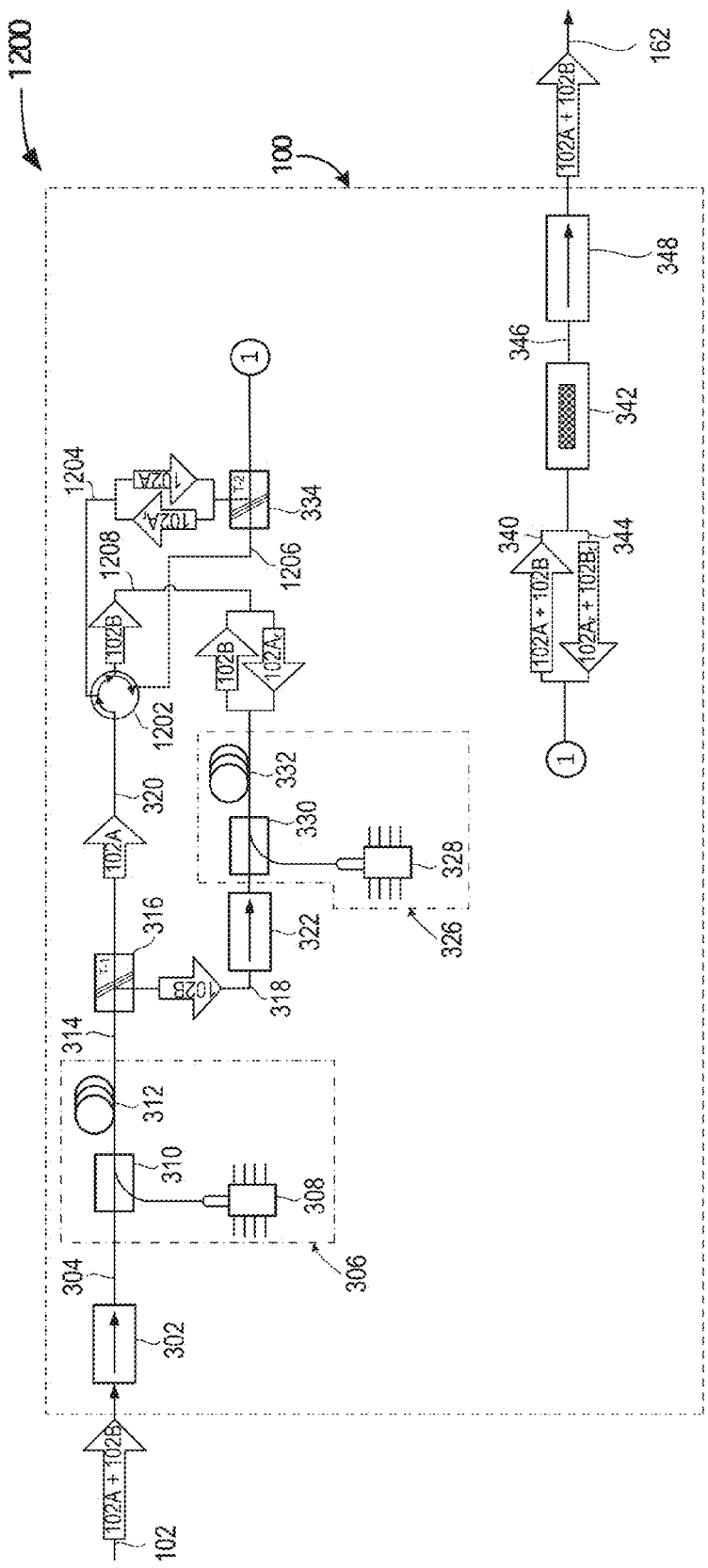
FIG. 12 is a schematic diagram of another illustrative amplification and reflected signal energy recovery system, in accordance with at least one embodiment of the present disclosure.

FIG. 12 is a schematic diagram of another illustrative amplification and reflected signal energy recovery system 1200, in accordance with at least one embodiment of the present disclosure. As depicted in FIG. 12, the amplified first optical wavelength band signal portion 102A exits the three-port, type-1, optical signal splitter/combiner 316 via output 320 and enters a four-port optical circulator 1202. The amplified first optical wavelength band signal portion 102A exits the four-port optical circulator 1202 via output 1204, and enters the three-port, type-2, optical signal splitter/combiner 338.

Also as depicted in FIG. 12, the first optical wavelength band signal portion 102A$_r$ reflected by the GFF 342 enters the three-port, type-2, optical signal splitter/combiner 338 where it is reflected back to the four-port optical circulator 1202. The reflected first optical wavelength band signal portion 102A$_r$ exits the four-port optical circulator 1202 via output 1208 and enters the amplifier 326 where at least a portion of the energy carried by the reflected first optical wavelength band signal portion 102A$_r$ may be used to amplify or otherwise increase the gain of the second optical wavelength band signal portion 102B.

Also as depicted in FIG. 12, the amplified second optical wavelength band signal portion 102B exits the amplifier 326 and enters the four-port optical circulator 1202 via output 1208. The amplified second optical wavelength band signal portion 102B exits the four-port optical circulator 1202 via output 1206 and enters the three-port, type-2, optical signal splitter/combiner 338 where it is combined with the amplified first optical wavelength band signal portion 102A to provide the output signal 162.

Figure 13:
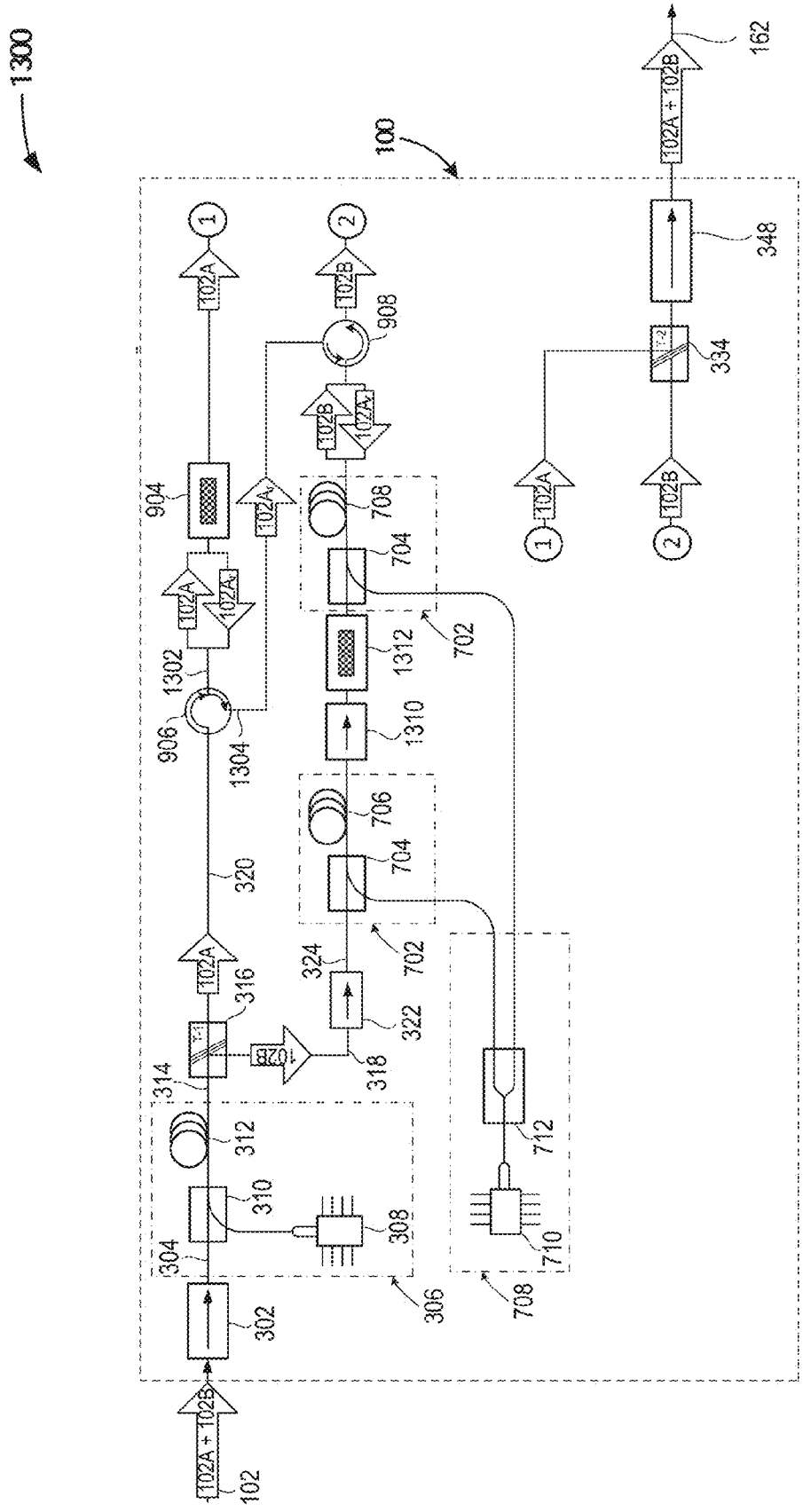
FIG. 13 is a schematic diagram of another illustrative amplification and reflected signal energy recovery system, in accordance with at least one embodiment of the present disclosure.

FIG. 13 is a schematic diagram of another illustrative amplification and reflected signal energy recovery system 1300, in accordance with at least one embodiment of the present disclosure. As depicted in FIG. 13, the output from the amplifier 306 passes through the three-port, type-2, optical signal splitter/combiner 316. The first optical wavelength band signal portion 102A passes through the optical circulator 906 and the GFF 904. The GFF 904 may be selected to pass optical frequencies within the first optical wavelength band signal portion 102A and reject other optical frequencies. A portion of the first optical wavelength band signal portion 102A$_r$ is reflected by the filter and enters the optical circulator via 1302. The reflected portion of the first optical wavelength band signal portion 102A$_r$ exits the optical circulator 906 via 1304 and enters the circulator 908. The portion of the first optical wavelength band signal portion 102A$_r$ exits the optical circulator 908 and enters the amplifier 702, where at least a portion of the energy carried by the reflected portion of the first optical wavelength band signal portion 102A$_r$ may be used to amplify or otherwise boost the gain of the second optical wavelength band signal portion 102B that exits the three-port, type-2, optical signal splitter/combiner 316 via 318.

After passing through the optical isolator 322 and the optical amplifier 702, the second optical wavelength band signal portion 102B passes through at least one GFF 1312. In some implementations, the GFF 1312 may be selected to pass optical frequencies falling within the second optical wavelength band signal portion 102B and block at least a portion of the remaining frequencies outside of the second optical wavelength band signal portion 102B. In some implementations, the reflected portion of the second optical wavelength band signal portion 102B$_r$ may be blocked using an optical isolator 1310.

The filtered and amplified first optical wavelength band signal portion 102A and the filtered and amplified second optical wavelength band signal portion 102B pass through the three-port, type-2, optical signal splitter/combiner 334 and the optical isolator 348 before exiting the amplifier 100 as an amplified, filtered, signal 162 that includes both the first optical wavelength band signal portion 102A and the second optical wavelength band signal portion 102B.

Figure 14:
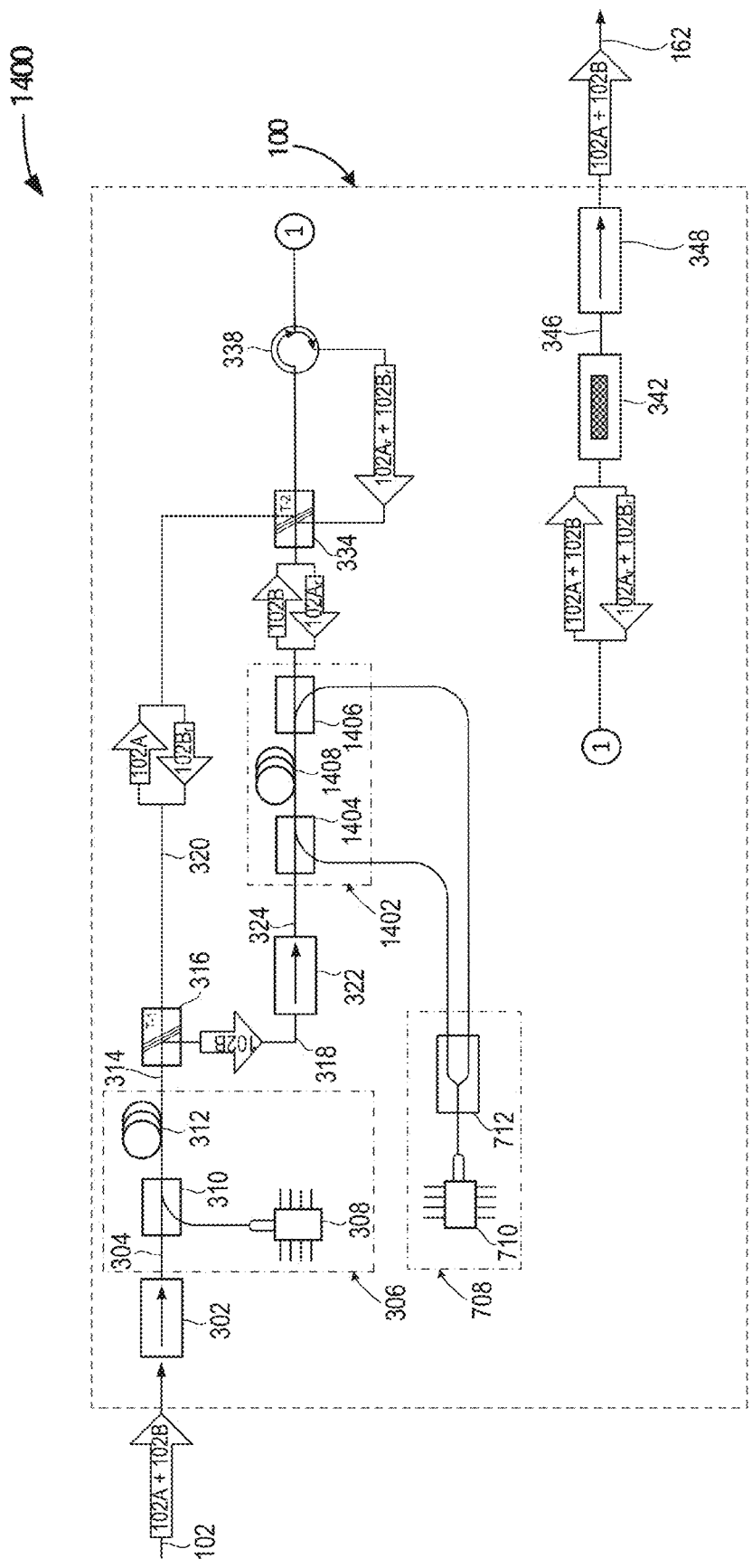
FIG. 14 is a schematic diagram of another illustrative amplification and reflected signal energy recovery system, in accordance with at least one embodiment of the present disclosure.

FIG. 14 is a schematic diagram of another illustrative amplification and reflected signal energy recovery system 1400, in accordance with at least one embodiment of the present disclosure. As depicted in FIG. 14, the output from the amplifier 306 may pass through the three-port, type-2, optical signal splitter/combiner 316. The first optical wavelength band signal portion 102A then enters the four-port, type-2, optical signal splitter/combiner 334 where the amplified first optical wavelength band signal portion 102A is combined with the amplified second optical wavelength band signal portion 102B. The combined signal passes through the optical circulator 338 and into the GFF 342. In some implementations the GFF 342 may pass optical frequencies falling within both the first optical wavelength band signal portion 102A and the second optical wavelength band signal portion 102B and reject other optical frequencies.

The GFF 342 reflects at least a portion of the first optical wavelength band signal portion 102A$_r$ and a portion of the second optical wavelength band signal portion 102B$_r$. The reflected first optical wavelength band signal portion 102A$_r$ and second optical wavelength band signal portion 102B$_r$ enter the four-port type-2, optical signal splitter/combiner 334 where the reflected first optical wavelength band signal portion 102A$_r$ enters an optical amplifiers 1402. The optical amplifier 1402 may include a co-pumped stage 1404 and a counter-pumped stage 1406 that feed the erbium doped fiber coil 1408.

In embodiments the optical amplifier 1402 may amplify some or all of the wavelengths in the second optical wavelength band signal portion 102B. In some implementations, the optical amplifier 1402 may be selected, operated, and/or tuned such that the gain of at least the second optical wavelength band signal portion 102B is sufficient and additional amplification of the second optical wavelength band signal portion 102B may be unnecessary. In embodiments, the optical amplifier 1402 may include at least one erbium doped fiber amplifier (EDFA). In embodiments, the optical amplifier 1402 may include at least one co-pumped amplifier stage 1404 and at least one counter-pumped amplifier stage 1406. In embodiments, the co-pumped amplifier stage 1404 and the counter-pumped amplifier stage 1406 may feed the same erbium doped fiber segment 1408. In other embodiments, the co-pumped amplifier stage 1404 and the counter-pumped amplifier stage 1406 may feed different erbium doped fiber segments (not shown in FIG. 14). The optical amplifier 1402 may be operably coupled to a single EDFA pump source 708 that includes at least one EDFA pump 710 and at least one optical splitter 712 may be used to power the optical amplifier 1402. Various configurations for EDFA pump sources that may be controlled locally or remotely are known to those of ordinary skill in the art. Also, the pump sources may be coupled to the optical path 320 in any known configuration.

Figure 15:
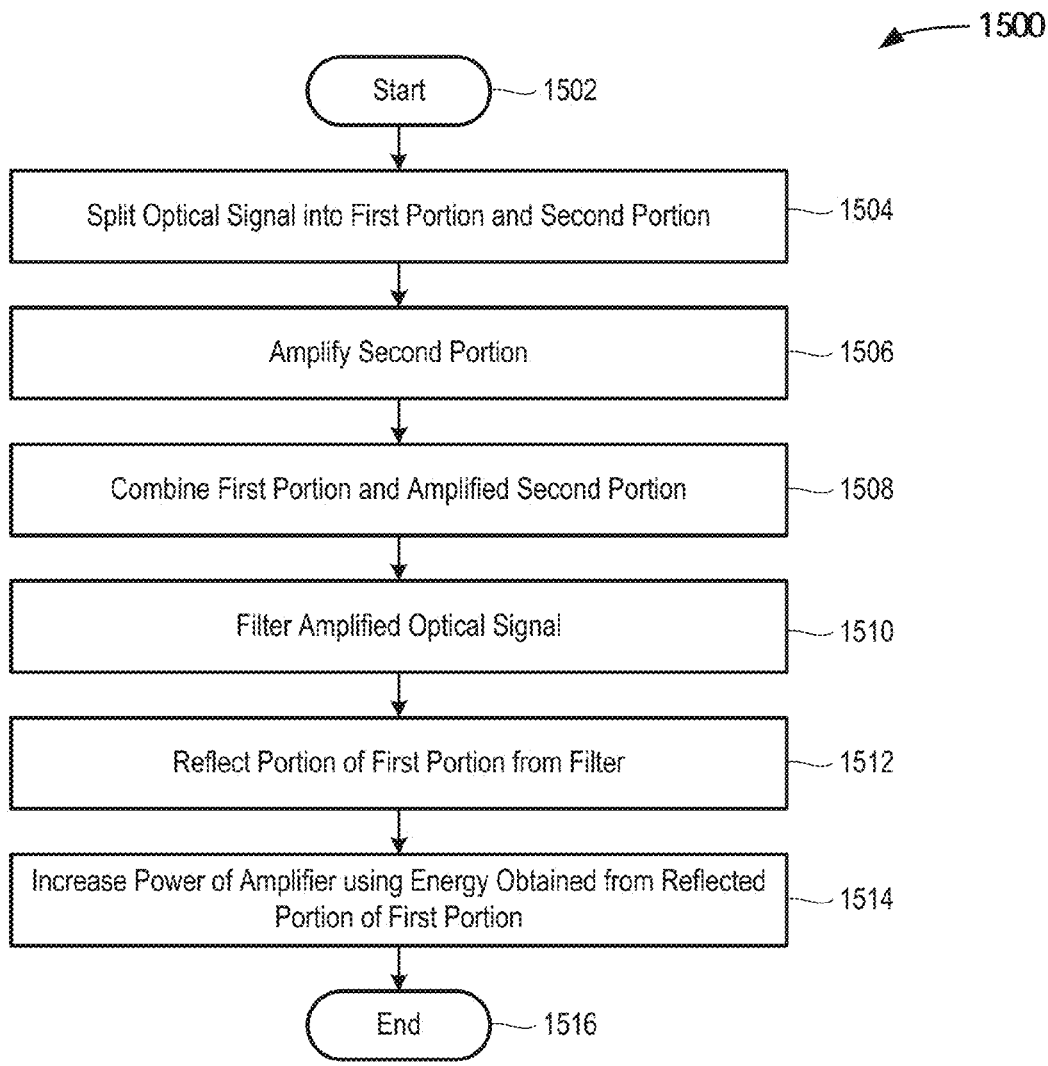
FIG. 15 is a high-level flow diagram of an illustrative amplification and reflected signal energy recovery method, in accordance with at least one embodiment of the present disclosure.

FIG. 15 is a high-level flow diagram of an illustrative amplification and reflected signal energy recovery method 1500, in accordance with at least one embodiment of the present disclosure. In at least some implementations, an incoming optical signal 102 may include at least a first optical wavelength band signal portion 102A and a second optical wavelength band signal portion 102B. As part of the amplification process, the incoming optical signal 102, the first optical wavelength band signal portion 102A, and/or the second optical wavelength band signal portion 102B may pass through one or more gain flattening filters (GFFs). At least a portion of the first optical wavelength band signal portion 102A$_r$ may be reflected by the one or more GFFs. At least a portion of the energy carried by this reflected portion of the first optical wavelength band signal portion 102A$_r$ may be recovered and used to amplify or otherwise increase the gain of the second optical wavelength band signal portion 102B. The reuse of energy in the reflected first optical wavelength band signal portion 102A$_r$ beneficially reduces the external energy supply requirements by a commensurate amount. Over the course of an extended optical communication run, significant power savings may be realized. The method 1500 commences at 1502.

At 1504, the incoming optical signal may be apportioned or otherwise split or divided into at least a first optical wavelength band signal portion 102A and a second optical wavelength band signal portion 102B. In some implementations, the incoming signal 102 may be split or otherwise apportioned using one or more three-port or four-port optical signal splitter/combiners. In at least some implementations, the one or more three-port or four-port optical signal splitter/combiners may be based on a dielectric thin film filter (TFF).

In embodiments, the one or more three-port or four-port optical signal splitter/combiners may include one or more type-1 optical signal splitter/combiners that transmit all or a portion of the first optical wavelength band signal portion 102A and reflect all or a portion of the second optical wavelength band signal portion 102B. In embodiments, the one or more three-port or four-port optical signal splitter/combiners may include one or more type-2 optical signal splitter/combiners that transmit all or a portion of the second optical wavelength band signal portion 102B and reflect all or a portion of the first optical wavelength band signal portion 102A.

At 1506, the second optical wavelength band signal portion 102B may pass through one or more amplifiers that amplify or otherwise increase the gain of the second optical wavelength band signal portion 102B. In embodiments, the one or more amplifiers may amplify some or all of the wavelengths in the second optical wavelength band signal portion 102B. In some implementations, the one or more amplifiers may be selected, operated, and/or tuned such that no additional amplification of the second optical wavelength band signal portion 102B is needed.

In embodiments, the one or more amplifiers may include one or more erbium doped fiber amplifiers (EDFAs). Each of the EDFAs may include a single or multi-stage EDFA, and may include one or more EDFA pump sources, a coupler, and an erbium-doped fiber segment. Various configurations for EDFA pump sources that may be controlled locally or remotely are known to those of ordinary skill in the art. Also, the pump sources may be coupled to the optical path in any known configuration.

At 1508, the first optical wavelength band signal portion 102A and the amplified second optical wavelength band signal portion 102B are combined. In some implementations, the first optical wavelength band signal portion 102A and the amplified second optical wavelength band signal portion 102B may be combined using one or more type-1 three-port or four-port optical signal splitter/combiners and/or one or more type-2 three-port or four-port optical signal splitter/combiners.

At 1510, the combined first optical wavelength band signal portion 102A and the amplified second optical wavelength band signal portion 102B may be filtered through one or more GFFs.

At 1512, at least a portion of the incident first optical wavelength band signal portion $102A_r$ may be reflected by the one or more GFFs.

At 1514, the one or more amplifiers used to amplify or otherwise increase the gain of the second optical wavelength band signal portion 102B may use at least a portion of the energy carried by the reflected first optical wavelength band signal portion $102A_r$ to amplify or otherwise increase the gain of the second optical wavelength band signal portion 102B. The method 1500 concludes at 1516.

Figure 16:
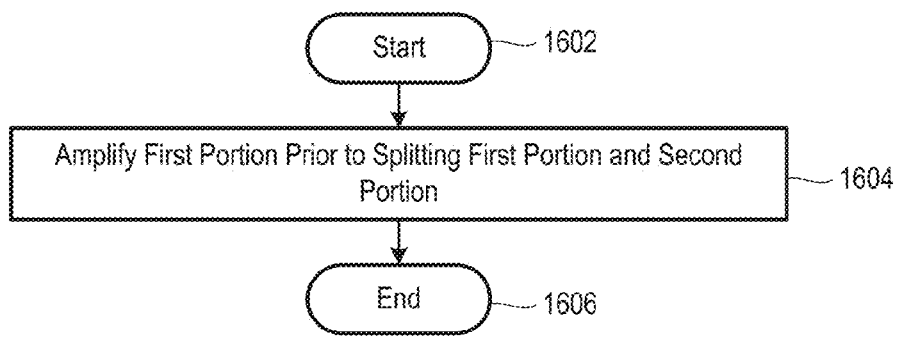
FIG. 16 is a high-level flow diagram of an illustrative amplification and reflected signal energy recovery method in which a first portion of an optical signal and a second portion of the optical signal are amplified prior to demultiplexing the optical signal, in accordance with at least one embodiment of the present disclosure.

FIG. 16 is a high-level flow diagram of an illustrative amplification and reflected signal energy recovery method 1600 that may be used in conjunction with all or a portion of the method 1500 depicted in FIG. 15, in accordance with at least one embodiment of the present disclosure. The illustrative amplification and reflected signal energy recovery method 1600 amplifies an incoming optical signal 102 prior to splitting the incoming optical signal into at least a first optical wavelength band signal portion 102A and a second optical wavelength band signal portion 102B. Such an amplification may, for example, occur prior to 1504 as depicted in FIG. 15.

In some implementations, the first optical wavelength band signal portion 102A may be amplified prior to splitting the first optical wavelength band signal portion 102A and the second optical wavelength band signal portion 102B. The method 1600 commences at 1602.

At 1604, the first optical wavelength band signal portion 102A may be amplified prior to splitting the first optical wavelength band signal portion 102A and the second optical wavelength band signal portion 102B. In at least some implementations, the incoming signal 102 that includes at least the first optical wavelength band signal portion 102A and the second optical wavelength band signal portion 102B may be amplified prior to splitting the incoming signal 102 into the first optical wavelength band signal portion 102A and the second optical wavelength band signal portion 102B. The method 1600 concludes at 1606.

Figure 17:
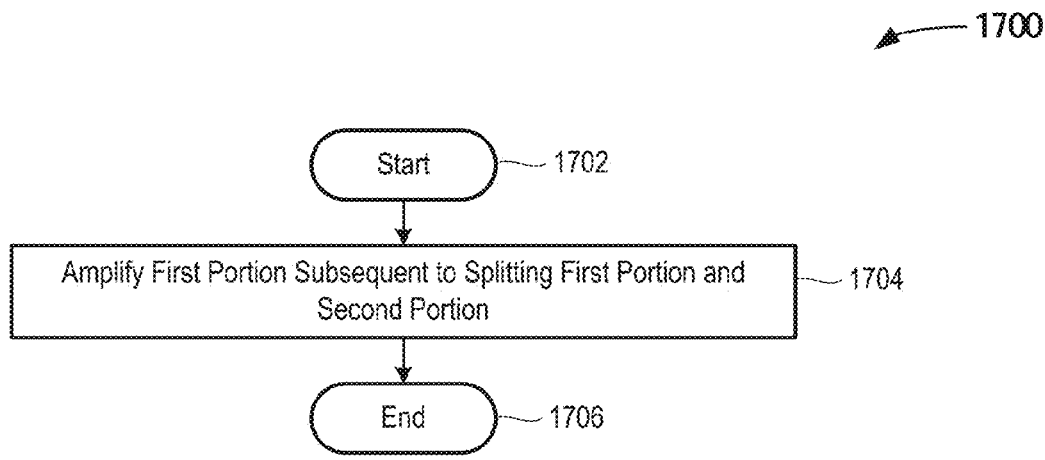
FIG. 17 is a high-level flow diagram of an illustrative amplification and reflected signal energy recovery method in which a first portion of an optical signal is amplified subsequent to demultiplexing the optical signal into the first portion and a second portion, in accordance with at least one embodiment of the present disclosure.

FIG. 17 is a high-level flow diagram of an illustrative amplification and reflected signal energy recovery method 1700 that may be used in conjunction with all or a portion of the method 1500 depicted in FIG. 15, in accordance with at least one embodiment of the present disclosure. The illustrative amplification and reflected signal energy recovery method 1700 amplifies a first optical wavelength band signal portion 102A of an incoming optical signal 102 subsequent to splitting the incoming optical signal 102 into at least the first optical wavelength band signal portion 102A and a second optical wavelength band signal portion 102B. In embodiments, such amplification of the first optical wavelength band signal portion 102A of the incoming optical signal 102 may occur prior to, concurrent with, or subsequent to 1506 as depicted in FIG. 15. The method 1700 commences at 1702.

At 1704, the incoming optical signal 102 may be split or otherwise apportioned into a first optical wavelength band signal portion 102A and a second optical wavelength band signal portion 102B using one or more type-1 three-port or four-port optical signal splitter/combiners and/or one or more type-2 three-port or four-port optical signal splitter/combiners. Subsequent to splitting the incoming optical signal 102 into the first optical wavelength band signal portion 102A and the second optical wavelength band signal portion 102B, the first optical wavelength band signal portion 102A and the second optical wavelength band signal portion 102B may be separately amplified using one or more amplifiers. The method 1700 concludes at 1706.

Figure 18:
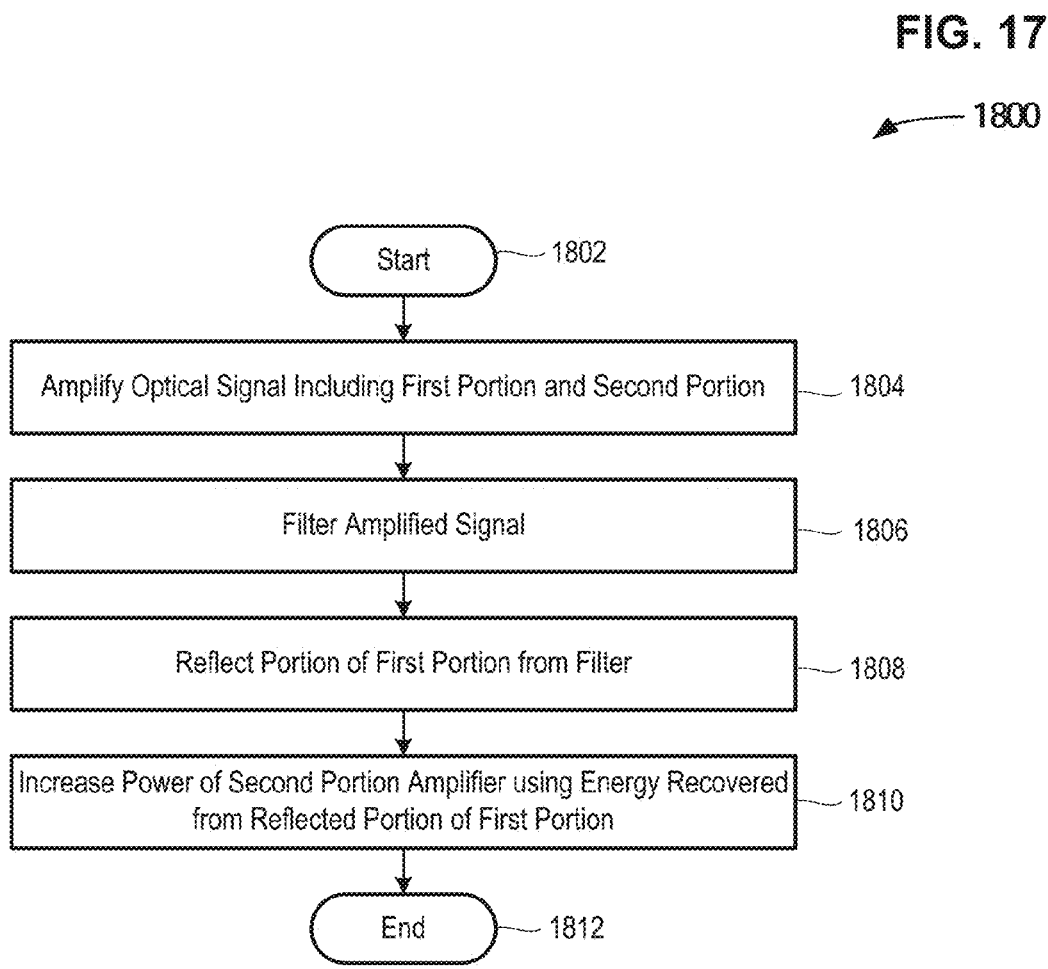
FIG. 18 is a high-level flow diagram of an illustrative amplification and reflected signal energy recovery method, in accordance with at least one embodiment of the present disclosure.

FIG. 18 is a high-level flow diagram of an illustrative amplification and reflected signal energy recovery method 1800, in accordance with at least one embodiment of the present disclosure. In at least some implementations, an incoming optical signal 102 may include at least a first optical wavelength band signal portion 102A and a second optical wavelength band signal portion 102B. As part of the amplification process, the incoming optical signal 102, the first optical wavelength band signal portion 102A, and/or the second optical wavelength band signal portion 102B may pass through one or more gain flattening filters (GFFs). At least a portion of the first optical wavelength band signal portion $102A_r$ may be reflected by the one or more GFFs. At least a portion of the energy carried by this reflected portion of the first optical wavelength band signal portion $102A_r$, may be recovered and used to amplify or otherwise increase the gain of the second optical wavelength band signal portion 102B. The reuse of energy in the reflected first optical wavelength band signal portion $102A_r$ beneficially reduces the external energy supply requirements by a commensurate amount. Over the course of an extended optical communication run, significant power savings may be realized. The method 1800 commences at 1802.

At 1804, an optical signal that includes at least a first optical wavelength band signal portion 102A and a second optical wavelength band signal portion 102B may be passed through one or more amplifiers.

At 1806, the amplified optical signal may be passed through one or more filters. In at least some implementations, the one or more filters may include one or more gain flattening filters (GFFs).

At 1808, the one or more filters reflect at least a portion of the first optical wavelength band signal portion $102A_r$. At least a portion of the reflected first optical wavelength band signal portion $102A_r$ may be received by the one or more amplifiers used to amplify the first optical wavelength band signal portion 102A and a second optical wavelength band signal portion 102B.

At 1810, at least some of the energy carried by the reflected portion of the first optical wavelength band signal portion $102A_r$ may be used by the one or more amplifiers to amplify or otherwise increase the gain of the second optical wavelength band signal portion 102B. The method 1800 concludes at 1812.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. An optical communication amplification system, comprising:
   an optical splitter to separate an optical signal into at least a first optical wavelength band signal portion and the second optical wavelength band signal portion;
   a first optical amplifier operably coupled to the optical splitter, the first optical amplifier to increase the energy of the second optical wavelength band signal portion;
   an optical combiner that combines the first optical wavelength band signal portion and the amplified second optical wavelength band signal portion; and
   an optical filter operably coupled to the optical combiner, wherein a portion of the energy of the first optical wavelength band signal portion reflected from the optical filter is received by the first optical amplifier where the received energy increases the energy of the second optical wavelength band signal portion.

2. The system of claim 1, further comprising:
   a second optical amplifier that receives the optical signal and increases the energy of at least the first optical wavelength band signal portion of the received optical signal.

3. The system of claim 2, further comprising:
   a first optical isolator operably coupled to an input of the second optical amplifier that increases the energy of at least the first optical wavelength band signal portion of the received optical signal.

4. The system of claim 2 wherein the second optical amplifier that increases the energy of at least the first optical wavelength band signal portion of the received optical signal comprises a C-band/L-band erbium doped fiber amplifier (C/L-EDFA).

5. The system of claim 1, further comprising:
   a second optical amplifier disposed subsequent to the optical splitter to receive the first optical wavelength band signal portion and increase an energy level of the first optical wavelength band signal portion.

6. The system of claim 1, further comprising:
   an optical circulator having a first port operably coupled to the optical combiner, a second port operably coupled to the optical filter, and a third port operably coupled to the first optical amplifier such that at least a portion of the energy of the reflected first optical wavelength band signal portion reflected from the optical filter is provided to the first optical amplifier.

7. The system of claim 1 wherein energy of the second optical wavelength band signal portion reflected from the optical filter is provided to the optical splitter.

8. The system of claim 1, further comprising:
   an optical isolator operably coupled to the first optical amplifier that increases the energy of the second optical wavelength band signal portion.

9. The system of claim 1:
   wherein the first optical wavelength band signal portion comprises a C-band;
   wherein the second optical wavelength band signal portion comprises an L-band; and
   wherein the optical amplifier that increases the energy of the second optical wavelength band signal portion comprises a C-band/L-band erbium doped fiber amplifier (C/L-EDFA).

10. The system of claim 9 wherein the optical splitter comprises a three-port C-band/L-band optical de-multiplexer that transmits the C-band wavelength signal portion and reflects the L-band wavelength signal portion.

11. The system of claim 10 wherein the optical combiner comprises a four-port C-band/L-band optical multiplexer that reflects the C-band wavelength signal portion and transmits the L-band wavelength signal portion.

12. The system of claim 9 wherein the optical filter comprises a gain flattening filter (GFF).

13. The system of claim 12 wherein the GFF comprises a Short Period Fiber Bragg Grating GFF.

14. An optical communication amplification method, comprising:
   splitting an optical signal into a first optical wavelength band signal portion and a second optical wavelength band signal portion;
   amplifying, via a first optical amplifier, the second optical wavelength band signal portion of the optical signal;
   combining the first optical wavelength band signal portion and the amplified second optical wavelength band signal portion to provide an amplified optical signal;
   filtering, via at least one optical filter, the amplified optical signal;
   receiving, by the optical amplifier, at least a portion of the first optical wavelength band signal portion reflected by the at least one optical filter; and
   increasing the energy of the first optical amplifier using energy in the reflected portion of the first optical wavelength band signal portion.

15. The method of claim 14, further comprising:
   amplifying, via a second-optical amplifier, at least the first optical wavelength band signal portion of the optical signal prior to splitting the optical signal into the first optical wavelength band signal portion and the second optical wavelength band signal portion.

16. The method of claim 14, further comprising:
   amplifying, via a second optical amplifier, at least the first optical wavelength band signal portion of the optical signal subsequent to splitting the optical signal into the first optical wavelength band signal portion and the second optical wavelength band signal portion.

17. The method of claim 14 wherein splitting an optical signal into a first optical wavelength band signal portion and a second optical wavelength band signal portion comprises:
   splitting the optical signal into a C-band signal portion and an L-band portion signal using a three-port, C-band/L-band, wavelength division demultiplexer.

18. The method of claim 17 wherein amplifying, via a first optical amplifier, the second optical wavelength band signal portion of the optical signal comprises:
   amplifying the L-band signal portion of the optical signal using an L-band erbium doped fiber amplifier (L-EDFA).

19. The method of claim 18 wherein combining the first optical wavelength band signal and the amplified second optical wavelength band signal to provide an amplified combined optical signal comprises:
   combining the C-band signal portion and the amplified L-band signal portion to provide an amplified optical signal using a four-port, C-band/L-band, wavelength division multiplexer.

20. The method of claim 19 wherein filtering, via at least one optical filter, the amplified optical signal comprises:
   filtering, via at least one Gain Flattening Filter (GFF), the amplified optical signal.

21. The method of claim 20 wherein filtering, via at least one Gain Flattening Filter (GFF), the amplified optical signal comprises:

filtering, via at least one Short Period Fiber Bragg Grating, the amplified optical signal.

22. The method of claim 20 wherein reflecting at least a portion of the first optical wavelength band signal portion of the amplified optical signal from the at least one optical filter comprises:
reflecting at least a portion of the C-band signal portion of the amplified optical signal from the at least one GFF.

23. The method of claim 19 wherein increasing the energy of the first optical amplifier using energy in the reflected portion of the first optical wavelength band signal portion reflected by the at least one optical filter comprises:
increasing the energy of the L-EDFA using energy in the reflected portion of the C-band signal portion reflected by the at least one GFF.

24. An optical communication amplification method, comprising:
amplifying, by an input optical amplifier, an optical signal that includes at least a first optical wavelength band signal portion and a second optical wavelength band signal portion;
passing the amplified optical signal through at least one optical filter;
receiving, at the first optical amplifier, at least a portion of energy in the first optical wavelength band signal portion reflected by the at least one optical filter; and
increasing the energy of the first optical amplifier used to increase the energy level of the second optical wavelength signal portion using the reflected energy in the first optical wavelength signal portion.

25. The method of claim 24 wherein amplifying an optical signal that includes at least a first optical wavelength band signal portion and a second optical wavelength band signal portion comprises:
amplifying, via an erbium doped fiber amplifier, the optical signal that includes at least a C-band signal portion and an L-band signal portion.

26. The method of claim 25 wherein increasing the energy of the first optical amplifier used to increase the energy level of the second optical wavelength band signal portion using the reflected energy in the first optical wavelength band signal portion comprises:
increasing the energy of an erbium doped fiber amplifier used to increase the energy level of the L-band signal portion using the reflected energy in the C-band signal portion.

* * * * *